US012732766B2

(12) United States Patent
Born et al.

(10) Patent No.: US 12,732,766 B2
(45) Date of Patent: Sep. 8, 2026

(54) MULTI-LOBE DIGITAL MICROPHONE ENABLED AUDIO CAPTURE AND SPATIALIZATION FOR GENERATING AN IMMERSIVE ARENA BASED AUDIO EXPERIENCE

(71) Applicant: SHURE ACQUISITION HOLDINGS, INC., Niles, IL (US)

(72) Inventors: John Born, Park Ridge, IL (US); Daniel Law, Glencoe, IL (US); Michael Lester, Buena Vista, CO (US); David Grundtvig, Arlington Heights, IL (US); Brent Robert Shumard, Mount Prospect, IL (US); William Oakley, Niles, IL (US); Chad Wiggins, Niles, IL (US); Paul Massaro, Niles, IL (US)

(73) Assignee: SHURE ACQUISITION HOLDINGS, INC., Niles, IL (US)

( * ) Notice: Subject to any disclaimer, the term of this patent is extended or adjusted under 35 U.S.C. 154(b) by 83 days.

(21) Appl. No.: 18/800,993

(22) Filed: Aug. 12, 2024

(65) Prior Publication Data

US 2024/0406654 A1 Dec. 5, 2024

Related U.S. Application Data

(63) Continuation-in-part of application No. 18/344,610, filed on Jun. 29, 2023, now Pat. No. 12,363,357.

(Continued)

(51) Int. Cl.

*H04S 7/00* (2006.01)
*G06F 3/16* (2006.01)

(Continued)

(52) U.S. Cl.

CPC ................ *H04S 7/30* (2013.01); *G06F 3/162* (2013.01); *G06T 7/20* (2013.01); *G06T 7/70* (2017.01);

(Continued)

(58) Field of Classification Search

CPC .... H04S 7/30; H04S 2400/11; H04S 2400/15; G06T 7/70; G06T 7/20;

(Continued)

(56) References Cited

U.S. PATENT DOCUMENTS 9,591,404 B1 3/2017 Chhetri
11,641,539 B2 * 5/2023 Clayton ................ H04R 27/00 381/74

(Continued)

OTHER PUBLICATIONS

Notice of Allowance and Fees Due (PTOL-85) Mailed on Mar. 18, 2025 for U.S. Appl. No. 18/344,610, 8 page(s).

(Continued)

*Primary Examiner* — Sean H Nguyen

(74) *Attorney, Agent, or Firm* — Alston & Bird LLP

(57) ABSTRACT

An example immersive audio signal processing system and a computer-implemented method for generating a target arena environment audio stream are provided. The example immersive audio signal processing system includes a plurality of multi-lobe digital sound wave capture devices positioned within the arena environment. The plurality of multi-lobe digital sound wave capture devices is configured to direct first beamformed lobes to a playing region of the arena environment, second beamformed lobes to a spectator region of the arena environment, and third beamformed lobes to a noise source region of the arena environment. A digital signal processor is configured to isolate noise audio components originating from at least the spectator region or (Continued)

the noise source region from the audio signal stream and generate a target arena environment audio stream.

25 Claims, 12 Drawing Sheets

Related U.S. Application Data

(60) Provisional application No. 63/501,493, filed on May 11, 2023, provisional application No. 63/367,541, filed on Jul. 1, 2022.

(51) Int. Cl.

| | |
|---|---|
| ***G06T 7/20*** | (2017.01) |
| ***G06T 7/70*** | (2017.01) |
| ***G10L 25/57*** | (2013.01) |
| ***H04R 3/00*** | (2006.01) |
| ***H04R 5/027*** | (2006.01) |

(52) U.S. Cl.
CPC .............. *G10L 25/57* (2013.01); *H04R 3/005* (2013.01); *H04R 5/027* (2013.01); *G06T 2207/10016* (2013.01); *G06T 2207/30228* (2013.01); *H04R 2201/401* (2013.01); *H04R 2410/01* (2013.01); *H04S 2400/11* (2013.01); *H04S 2400/15* (2013.01)

(58) Field of Classification Search
CPC . G06T 2207/10016; G06T 2207/30228; G06F 3/162; G10L 25/57; H04R 3/005; H04R 5/027; H04R 2201/401; H04R 2410/01
USPC ............................................................. 381/1
See application file for complete search history.

(56) References Cited

U.S. PATENT DOCUMENTS

| | | | | |
|---|---|---|---|---|
| 2007/0274534 | A1 | 11/2007 | Lockhart et al. | |
| 2008/0247567 | A1 | 10/2008 | Nolerbakken et al. | |
| 2017/0188170 | A1* | 6/2017 | Prins | H04S 7/303 |
| 2017/0338903 | A1 | 11/2017 | Oldfield et al. | |
| 2019/0105568 | A1 | 4/2019 | Platt et al. | |
| 2020/0053464 | A1* | 2/2020 | Peters | G06F 3/165 |
| 2020/0053505 | A1* | 2/2020 | Peters | H04S 7/304 |
| 2021/0256987 | A1 | 8/2021 | Edlin et al. | |
| 2023/0276189 | A1* | 8/2023 | Elff | H04S 3/004 381/303 |

OTHER PUBLICATIONS

U.S. Appl. No. 18/344,610, filed Jun. 29, 2023, 2024/0007688, Pending.
ISA/220—Notification of Transmittal or Search Report and Written Opinion of the ISA, or the Declaration Mailed on Oct. 13, 2023 for WO Application No. PCT/US23/069416, 58 page(s).
Renato S. Pellegrini et al., Object-Audio Capture System for Sports Broadcast, Sep. 27, 2018.
Examiner Interview Summary Report (PTOL—413) Mailed on Jul. 14, 2026 for U.S. Appl. No. 19/241,792, 1 page(s).
Notice of Allowance and Fees Due (PTOL—85) Mailed on Jul. 14, 2026 for U.S. Appl. No. 19/241,792, 8 page(s).

* cited by examiner

MULTI-LOBE DIGITAL MICROPHONE ENABLED AUDIO CAPTURE AND SPATIALIZATION FOR GENERATING AN IMMERSIVE ARENA BASED AUDIO EXPERIENCE

CROSS-REFERENCE TO RELATED APPLICATIONS

The present application is a continuation-in-part of U.S. patent application Ser. No. 18/344,610, filed Jun. 29, 2023, which claims the benefit of U.S. Provisional Patent Application No. 63/367,541, filed Jul. 1, 2022, and U.S. Provisional Patent Application No. 63/501,493, filed May 11, 2023, the contents of each application are hereby incorporated by reference in their entireties.

TECHNOLOGICAL FIELD

Embodiments of the present disclosure relate generally to methods, systems, and computer program products for audio capture and spatialization proximate an arena environment.

BACKGROUND

Applicant has identified many deficiencies and problems associated with existing methods, apparatus, and systems related to capturing, processing, and transmitting audio data in arena environments. Through applied effort, ingenuity, and innovation, many of these identified deficiencies and problems have been solved by developing solutions that are configured in accordance with embodiments of the present disclosure, many examples of which are described herein.

BRIEF SUMMARY

In general, embodiments of the present disclosure provide methods, apparatus, systems, devices, and/or the like for capturing, processing, and generating audio data to provide an immersive audio experience for a spectator.

The immersive audio signal processing system described herein utilizes various sound wave capture devices, including various digital sound wave capture devices and multi-lobe sound wave capture devices, to capture audio from throughout an arena environment. Utilization of the various sound wave capture devices allows overlapping audio coverage of the playing region as well as coverage of audio emanating from the spectator region. Multi-lobe digital sound wave capture devices enable the use of beamformed lobes to selectively include and exclude audio in an output audio signal stream. Additionally, or alternatively, the immersive audio signal processing system described herein may utilize various audio processing techniques to isolate, classify, and selectively include or exclude audio based on the classified source. Utilizing various audio processing techniques, audio stream capture may be coordinated with a live action tracking system and/or video input creating an immersive audio experience synchronized with live action and/or camera motion.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below and embodied by the claims appended herein.

BRIEF DESCRIPTION OF THE DRAWINGS

The description of the illustrative embodiments can be read in connection with the accompanying figures. It will be appreciated that, for simplicity and clarity, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
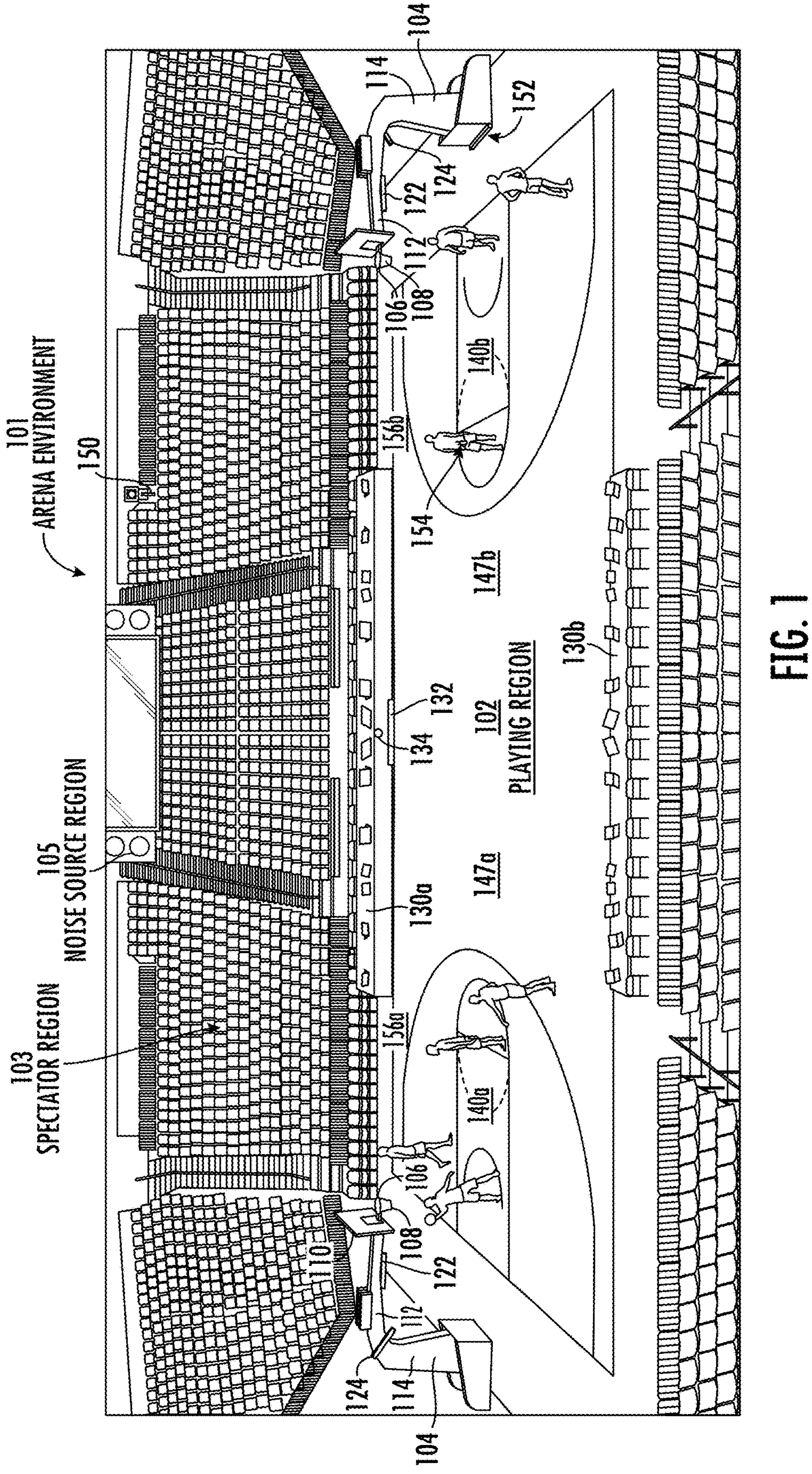
FIG. 1 illustrates an example arena environment comprising an immersive audio signal processing system, according to an embodiment of the present disclosure.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention address technical problems associated with capturing, processing, and generating audio signal streams, in other words, any collection of audio data, to provide an immersive audio experience for a remote spectator of a sporting event or other performance. The disclosed techniques can be implemented in an arena environment to capture audio signal streams, isolate the audio signal streams based on class and/or locality, select desired audio classes and/or locales, and generate an immersive audio stream that is configured for output via television broadcast or streaming service. As described herein, an arena environment refers to any building, venue, facility, or space comprising a playing region and a spectator region. In some embodiments, an arena environment may further include a noise source region and a playing region adjacent area. An arena environment may comprise an indoor sporting arena, such as a basketball arena, football stadium, hockey stadium, soccer stadium, boxing arena, etc.; an indoor entertainment arena, such as a concert hall, theater, etc.; an outdoor stadium environment, such as an outdoor football stadium, an outdoor baseball stadium, a soccer stadium, a concert venue, etc.; or another similar spectator environment in which audio signal streams are captured to create an immersive audio experience.

Techniques disclosed herein to create an immersive audio experience include: selection and placement of sound wave capture devices such as 1.5D microphone arrays, 2D linear and planar microphone arrays, 3D surface arrays of microphones, 3D suspended arrays of microphones, and ambisonic microphones, in conjunction with traditional omnidirectional and unidirectional sound wave capture devices; processing of audio signal streams to improve audio quality through artificially intelligent (AI) denoising and acoustic echo cancellation; identification and classification of audio sources; localization of captured audio signal streams; and selection and generation of an immersive audio stream.

Some flawed approaches to producing an immersive audio experience involve positioning many static, directional, and analog microphones around an arena environment. The imperfect directionality of these microphones allows unwanted sounds (such as music, public address (PA) audio, spectator sounds, etc.) to be included in the output audio stream.

In addition, if a broadcast television producer desires to capture audio in new directions or from another source, the directional microphones must be manually moved by an operator. Manual movement of directional microphones is also required when the target source of the audio capture moves around the arena environment. This can be particularly problematic in large arena environments such as football stadiums, soccer stadiums, baseball stadiums, and the like.

Capturing sufficient localized audio signal streams to create an immersive experience using directional microphones also requires many directional microphones and accompanying cabling to point to the various areas of interest in an arena environment. Finally, in-game audio produced from directional microphones must be manually mixed by an engineer by selecting specific audio sources to enable and disable, which can be difficult to execute during a live broadcast.

Some example immersive audio signal processing systems disclosed herein utilize various sound wave capture devices to capture an audio signal stream from an arena environment. For example, multi-lobe digital sound wave capture devices may be configured to define beamformed lobes based on locality. Utilizing multi-lobe digital sound wave capture devices to define beamformed lobes provides coverage of a wide area while still allowing focused selection of specific regions of interest.

Use of multi-lobe digital sound wave capture devices, such as steerable digital sound wave capture devices and switchable digital sound wave capture devices configured with beamformed lobes allows for enhanced audio region selectivity while minimizing the number of needed sound wave capture devices by selectively updating the audio capture area based on the desired immersive audio experience.

Immersive audio signal processing systems as discussed herein are configured to use advanced audio processing techniques, such as separation and classification of audio sources, to further classify and focus the captured audio streams. For example, in circumstances where an arena environment includes a basketball court, an artificial intelligence (AI) classification module may be disposed in a digital signal processing chain to classify an audio signal stream source as voice, conversation, ball sounds, player exclamations, or PA sounds. Similarly, in circumstances where an arena environment includes a baseball field, the AI classification module may classify the crack of the bat, the slap of the glove, exclamations from the dugout, or other sounds that may contribute to the overall spectator experience.

The classification of audio sources within a beamformed lobe may allow the immersive audio system to define a beamformed lobe based not only on locality (i.e., region within the arena), but also based on the classification type of the audio sources. For example, a beamformed lobe may be defined to encompass sources classified as playing region player sounds, playing region ball sounds, playing region conversations, playing region adjacent area conversations, spectator region conversations, and so on. Classifying audio signal streams in this way and providing multiple channels of audio signal streams according to classification and locality may enable an immersive audio stream to reduce unwanted noise such as spectator region conversations and public announcer noise, enhancing the desirable audio from the playing region and playing region adjacent area, even in circumstances where the source of the desirable audio rapidly and unpredictably moves about the playing region of an arena environment.

The form factors of the microphone arrays may also allow for unique and stealth placements of the audio devices to blend into an arena environment. In the basketball court example, array sound wave capture devices of various form factors may be positioned along the edges of backboards, along basketball hoop support assemblies, along tables, along lights, or integrated into walls, ceilings, and floors. In the baseball example, array sound wave capture devices may be placed along the backstop or outfield wall, along the dugout, within existing protective enclosures, or other similar positions. The stealth form factor of array sound wave capture devices coupled with an immersive audio signal processing system that is configured to use fewer sound wave capture devices allows capture of sufficient immersive audio content without distracting spectators or participants.

As a result of the improved capture and classification of audio signal streams, captured audio signal streams may be distributed in audio channels in a manner that enables the rapid generation of a variety of unique immersive audio experiences. A television producer could easily create multiple audio mixes that provide a different immersive experience focusing on different aspects of the game or performance. For example, an immersive audio signal processing system as discussed herein could produce an immersive audio experience from various perspective locations, for example: an immersive audio experience as an audience member in the stands; an immersive audio experience from the perspective of a player playing on the playing surface of an arena environment; an immersive audio experience from the perspective of an assistant coach standing near other coaches and players, an immersive audio experience seated next to play-by-play announcers; or an immersive audio experience providing selective focus or de-focus on other arena environment audio components such as in-stadium music, crowd noise, on-court sounds, and so on.

The perspective of the immersive audio experience may also be updated to track with the movement of a player or another individual. For example, the immersive audio experience may follow a player, coach, or another individual as the individual moves around the arena environment. In one non-limiting example, the perspective of the immersive audio experience may follow a player as they move through a team tunnel (e.g., tunnel area) from the locker room onto the playing region. In such an example, the immersive audio system may be configured to produce an immersive audio experience for a remote spectator that gradually builds in-stadium music, crowd noise, and other arena environment sounds as the player moves through and emerges from the team tunnel into the playing region.

By labeling the audio signal streams according to location within the arena environment, audio signal streams can change based on the current camera view of a broadcast television feed. For example, in the basketball arena example, the audio stream coupled with the broadcast television feed may be configured such that sounds originating from the left side of the broadcast television view may be output on the left channel of a multiple audio channel sound system (e.g., surround sound). Similarly, sounds originating from behind the broadcast television view may be output on the rear channel of a multiple audio channel sound system. When the broadcast television perspective switches to a different camera view the output channels may be updated to coordinate audio streams with the associated output audio system channel.

In some examples, audio stream capture may be integrated with camera motion. For example, camera motion may be dictated by a positional sensing system, such as Statcast™, Next Gen Stats™, or another live action tracking system. The locale of captured audio data may be automatically controlled using beamformed lobes of a multi-lobe digital sound wave capture device to correspond to an updated field of view defined by the current camera view.

Classified audio signal streams could be transmitted on independent channels to a remote viewing display, allowing a remote viewing spectator to decide the mix of components to create their own immersive audio experience on the remote viewing display. Alternatively, a remote viewing spectator could select the desired immersive audio experience by selecting a perspective from within the arena to experience the audio content from (e.g., selecting a "sideline" experience, an "on the court" experience, an "in the stands" experience, and so on) from which the system may determine the immersive audio content based on the tagged 3D locations of the audio signal streams.

Immersive Audio Signal Processing System Details

FIG. 1 illustrates an exemplary arena environment 101 that is configured to include an immersive audio signal processing system 100 structured in accordance with various embodiments of the present invention. The depicted arena environment 101 is a basketball arena environment. However, immersive audio signal processing systems 100 as discussed herein may be configured for operation within a variety of arena environments including football stadium environments, hockey stadium environments, soccer stadium environments, baseball stadium environments, concert hall or stadium environments, theatrical environments, and the like.

An immersive audio signal processing system (e.g., immersive audio signal processing system 100) refers to any system of sound wave capture devices (e.g., microphones) and associated devices, including processing devices, configured to capture audio signal streams from an arena environment and generate a target arena environment audio stream to create an immersive audio experience for a remote spectator.

The example arena environment 101 depicted in FIG. 1 comprises a rectangular playing region 102 having two ends and two sides, player bench areas 156*a*, 156*b* adjacent to the playing region 102, a spectator region 103, and a noise source region 105. The depicted noise source region 105 includes a jumbotron video board with speakers on lateral sides for playing music and PA remarks to spectators seated in the spectator region 103.

As referenced herein, a playing region refers to the portion of the arena environment in which the performers are designated to perform. A playing region may comprise a basketball playing surface, a football field, the ice surface of a hockey stadium, the pitch of a soccer field, the field area of a baseball field, the stage of an entertainment arena, concert hall, or theater, or another similar participant region of an arena environment.

Figure 8:
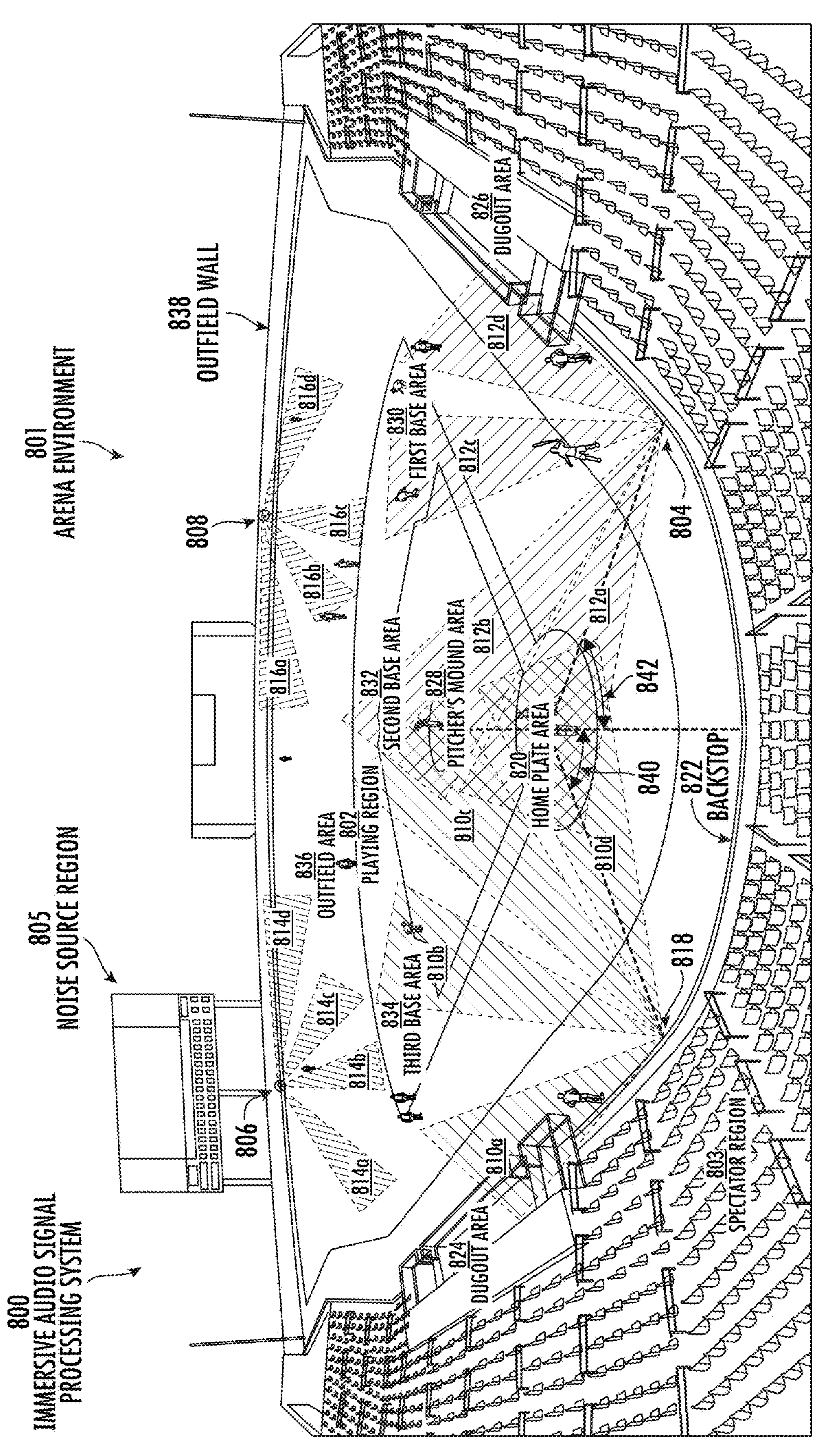
FIG. 8 illustrates an example stadium environment comprising an immersive audio signal processing system, according to an embodiment of the present disclosure.

An arena environment may further include a playing region adjacent area (e.g., player bench area 156*a*, 156*b*). A playing region adjacent area refers to the physical area of the arena environment in which performers are positioned when they are not in the playing region. For example, the playing region adjacent area may include player bench areas (e.g., player bench area 156*a*, 156*b*) in a basketball arena environment, the dugout area (e.g., dugout area 824, 826 as shown in FIG. 8) in a baseball stadium environment, the backstage area in a concert or theater arena environment, and other similar areas adjacent to a playing region.

At each end of the playing region 102 is a basketball hoop support assembly 104. In some embodiments, a basketball hoop support assembly may comprise a basketball hoop stanchion. Each basketball hoop support assembly 104 comprises a rim 106 with an attached net 108 and connected to a backboard 110. Each basketball hoop support assembly 104 further comprises a horizontal hoop support beam 112 and a vertical hoop support beam 114 physically coupled by a support beam connector and configured to hold the backboard 110, rim 106, and net 108 in an elevated position. Each basketball hoop support assembly 104 is configured to support a number of sound wave capture devices as discussed in detail in connection with FIG. 2 below.

A sound wave capture device refers to any apparatus or device comprising one or more transducers configured to receive sound waves and convert the sound waves into an electrical signal. In some embodiments, a sound wave capture device may comprise a digital sound wave capture device configured to encode the sound as a digital signal for transmission. A sound wave capture device may comprise an analog sound wave capture device configured to compress and expand the audio signal during transmission. A sound wave capture device may be configured to transmit the electrical signal wirelessly to a receiver.

Figure 2:
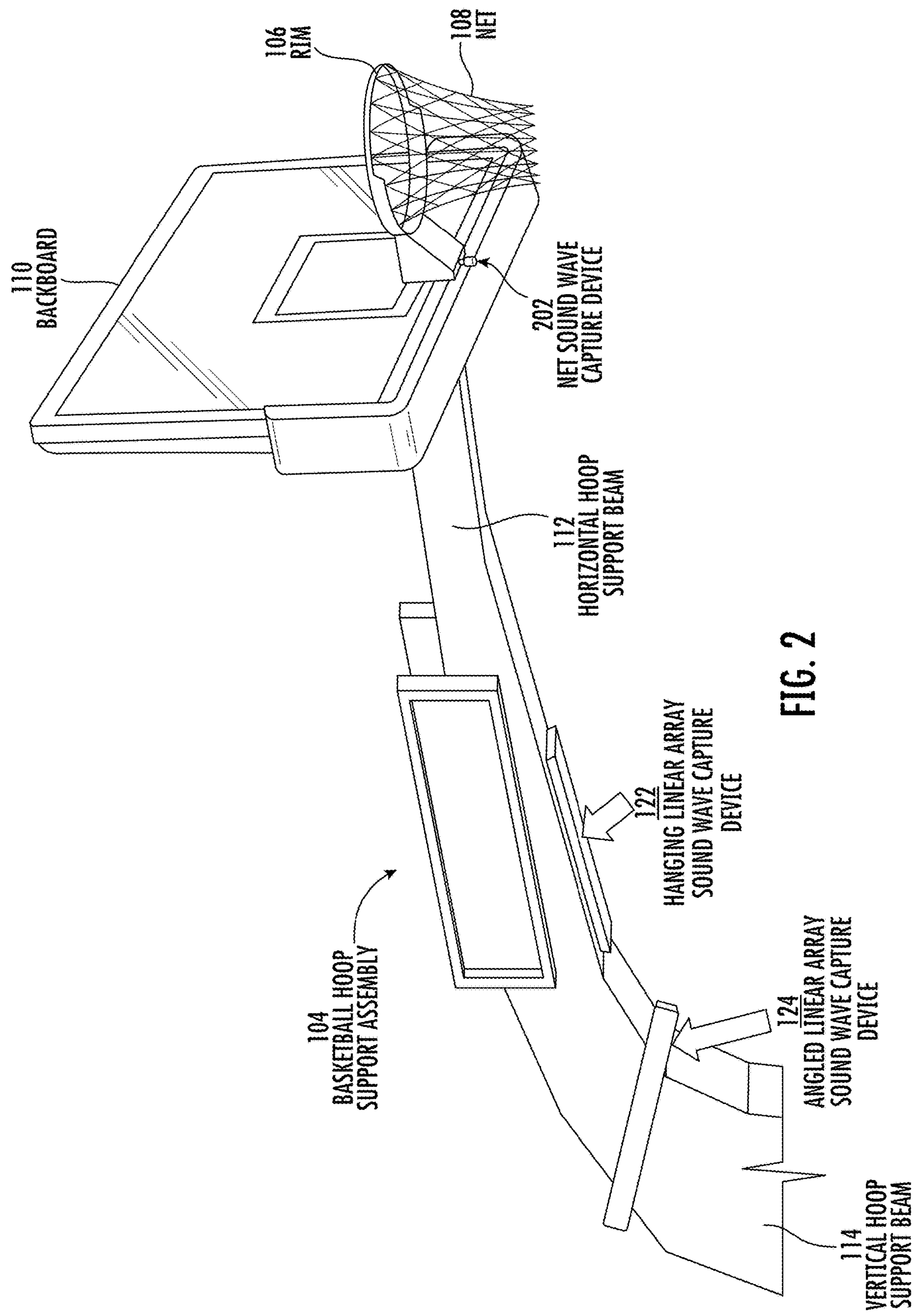
FIG. 2 depicts an example basketball hoop support assembly comprising a plurality of sound wave capture devices, including array capture devices, configured to capture an audio signal stream as input for an immersive audio signal processing system, according to an embodiment of the present disclosure.

In addition to those sound wave capture devices shown in the detailed view of FIG. 2, FIG. 1 depicts a support base linear array sound wave capture device 152 positioned near the base of the basketball hoop support assembly 104. In the depicted embodiment, the support base linear array sound wave capture device 152 is directed generally toward the surface of the playing region 102. Positioning a support base linear array sound wave capture device 152 near the base of the basketball hoop support assembly 104 and directed toward the playing region 102 allows overlapping coverage of the areas of the court of highest interest, such as the key areas (140*a*, 140*b*) and surrounding areas.

The depicted support base linear array sound wave capture device 152 is a Shure MXA710 four-foot array sound wave capture device that is configured to produce up to 8 beamformed steerable lobes. Although depicted as a linear array sound wave capture device, the support base linear array sound wave capture device 152 may be any multi-lobe digital sound wave capture device capable of capturing playing region audio content, such as a Shure MXA310 array sound wave capture device.

As referenced herein, a multi-lobe digital sound wave capture device refers to any sound wave capture device configured to filter and/or enhance received sound waves to achieve spatial selectivity in the form of discrete beamformed lobes. In some embodiments, a multi-lobe digital sound wave capture device may comprise a steerable digital sound wave capture device. In some embodiments, a multi-lobe digital sound wave capture device may comprise a switchable sound wave capture device.

A steerable digital sound wave capture device refers to any multi-lobe digital sound wave capture device that is configured to move or reposition one or more beamformed lobes from a first audio capture area to a second audio capture area. Such adjustment may be performed via beamforming techniques, such as delay and sum. In some embodiments, the width, distance, and number of beamformed lobes generated by a steerable digital sound wave capture device may be adjusted through beamforming techniques. Example steerable digital sound wave capture devices include various array sound wave capture devices. In some embodiments, a steerable digital sound wave capture device may be configured to transmit and receive wireless communication such that one or more beamformed lobes may be updated remotely.

An array sound wave capture device refers to a sound wave capture device comprising a plurality of transducers configured to utilize signal processing techniques to uniformly capture and process sound wave data. An array sound wave capture device may use beamforming techniques to produce one or more steerable beamformed lobes. Example array sound wave capture devices include linear array sound wave capture devices, planar array sound wave capture devices, circular array sound wave capture devices, 2D array sound wave capture devices, 3D surface array sound wave capture devices, suspended 3D array sound wave capture devices, and the like.

Array sound wave capture devices may further include one-dimensional arrays with improved directionality (e.g., 1.5D array sound wave capture devices). A 1.5D array sound wave capture device is an array sound wave capture device configured to provide a one-dimensional form factor that, in some embodiments, has added directivity, for most, if not all, frequencies, in dimensions that, conventionally, have equal sensitivity in all directions as discussed in greater detail in commonly owned U.S. patent application Ser. No. 11/297,426, titled "One-Dimensional Array Microphone with Improved Directivity," and filed on Aug. 22, 2020, which is hereby incorporated by reference in its entirety.

Linear array sound wave capture device refers to an array sound wave capture device wherein the plurality of transducers is arranged such that the length of the array of transducers exceeds the width. In some embodiments, a linear array arrangement of transducers may enable a linear array sound wave capture device to be configured to use highly selective end fire beamformed lobes to capture sound emanating from a direction parallel to the linear array and broadside beamformed lobes to capture sound emanating from a direction perpendicular to the linear array. As referenced herein, example linear array sound wave capture devices include ground linear array sound wave capture devices, hanging linear array sound wave capture devices, angled linear array sound wave capture devices, support base linear array sound wave capture devices, spectator linear array sound wave capture devices, and the like.

Circular array sound wave capture device refers to a planar array sound wave capture device wherein the plurality of transducers is arranged in a circular pattern. In some embodiments, a circular array arrangement of transducers may enable a circular array sound wave capture device to be configured to generate beamformed lobes to selectively capture audio data in a 360-degree audio capture area from the surface of the transducers. As referenced herein, example circular array sound wave capture devices include table top array sound wave capture devices.

A switchable digital sound wave capture device refers to any multi-lobe digital sound wave capture device in which the mechanism for separating received sound waves provides selection between a plurality of defined capture area orientations. For example, a switchable digital sound wave capture device may comprise a multi-pattern condenser. By enabling and disabling the various condenser patterns, audio data may be captured from different locations relative to the switchable digital sound wave capture device. In some embodiments, a switchable digital sound wave capture device may comprise a plurality of transducers configured in different orientations, such that an audio capture area may be selected by enabling and disabling the activation status of various transducers. In this way, certain beamformed lobes are activated while others are deactivated. In some embodiments, a switchable digital sound wave capture device may be configured to transmit and receive wireless communication such that capture area orientations may be updated remotely. In some examples, a switchable digital sound wave capture device may comprise a Shure KSM44A.

As referenced herein, audio capture area refers to the physical area from which a particular sound wave capture device may receive audio data. For example, in a directed sound wave capture device, such as a shotgun microphone, the audio capture may include a narrow but long audio capture area, such that audio data may be captured from physical locations in a very narrow or directed set of locations. In another example, a circular array sound wave capture device may simultaneously capture audio data in a wide set of physical locations. Some devices, such as multi-lobe digital sound wave capture devices may be continually updated to change the audio capture area of the device. In some instances, a multi-lobe sound wave capture device may be configured to capture audio data from a narrow audio capture area, while in other instances, a multi-lobe sound wave capture device may be configured to capture audio data from a wide audio capture area. In general, a narrow audio capture area may receive audio data from further physical locations due to reductions in noise from other audio sources.

To capture additional audio content on or near the playing region 102, some or all of the participants (e.g., players, coaches, referees, etc.) may be equipped with a bodypack sound wave capture device 154. The depicted bodypack sound wave capture device 154 is a Shure Q5X PlayerMic, however, the bodypack sound wave capture device 154 may be any sound wave capture device that may be worn by a player or other participant while still enabling participation. Utilization of a bodypack sound wave capture device 154 allows capture and transmission of player, coach, and referee conversations, as well as other on-court and in-game audio content that adds to an immersive audio experience. Such bodypack sound wave capture devices 154 also allow for the capture of playing region adjacent area audio data, such as player bench area 156*a*, 156*b* audio coverage. In addition, bodypack sound wave capture devices 154 may include one or more wireless transmitters configured to determine and transmit location data of the bodypack sound wave capture device 154. Such location data may be used in an immersive audio signal processing system 100 to aid in processing, filtering, and mixing various audio signals comprising an immersive audio experience.

The depicted arena environment 101 further comprises a first scorer's table 130*a* and a second scorer's table 130*b* positioned on the surface of the playing region 102 and running parallel to each lateral side of the playing region 102. In the depicted embodiment, a table top array sound wave capture device 134 has been hung from the first scorer's table 130*a* and directed toward the playing region 102. A ground linear array sound wave capture device 132 is disposed on the floor surface of the playing region 102 at the base of the first scorer's table 130*a* and directed upward from the surface of the playing region 102. The position of the table top array sound wave capture device 134 and the ground linear array sound wave capture device 132 is illustrated more clearly in the detail view of the first scorer's table 130*a* shown in FIG. 3.

During a basketball game, the depicted playing region 102 is populated with participating players, referees, team coaches, cheerleaders, halftime show members, and others. These participants will create a variety of sounds, many of which are not effectively captured by directional microphone setups but which, if captured, would add considerable value to an immersive audio experience for a remote viewing spectator. For example, conversations between players, coaches, and referees; player exclamations; floor noises such as squeaking shoes and bouncing balls; whistles; and so on, collectively referred to as on-court sounds are inconsistently or infrequently captured but should play a central role in any immersive experience. Playing region adjacent area noises, such as conversations in the player bench area 156*a*, 156*b*, may be selectively included or excluded in an immersive audio experience.

The depicted arena environment 101 includes a spectator region 103. The spectator region refers to the portion of the arena environment designated for in-person spectators during game play or a performance. The spectator region comprises seating and viewing areas for in-person spectators to watch the events occurring in the playing region. In some embodiments, the spectator region may be configured in an amphitheater configuration such that it fully or partially encircles the playing region. The spectator region may also be configured to encompass one or two lateral sides of the playing region. The depicted spectator region 103 of FIG. 1 provides seating and viewing areas for in-person spectators to watch the basketball game occurring in the playing region 102.

The depicted spectator region 103 may be the source of a number of sounds during a basketball game. Some of these sounds may be desirable for inclusion in a television broadcast while others are undesirable and should be excluded. For example, crowd cheers and boos may be considered as desirable sounds to be included in a television broadcast while other sounds, such as spectator conversations, exclamations from individual spectators, and announcements from the PA system, may be deemed undesirable.

Figure 3:
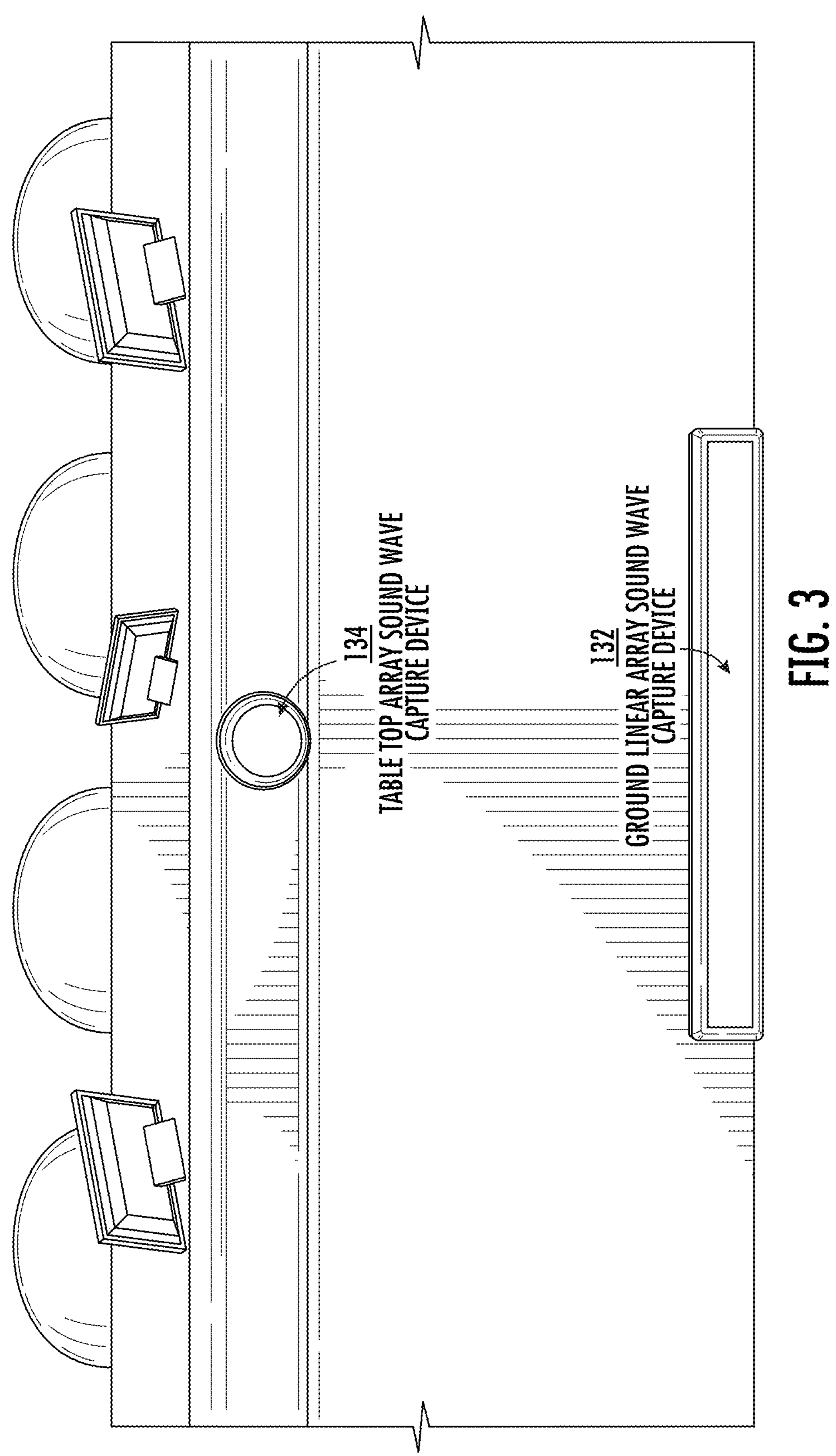
FIG. 3 depicts an example scorer's table comprising a plurality of sound wave capture devices, including array capture devices, configured to capture an audio signal stream as input for an immersive audio signal processing system, according to an embodiment of the present disclosure.

In addition to those sound wave capture devices shown in the detailed views of FIG. 2 and FIG. 3, FIG. 1 depicts a spectator linear array sound wave capture device 150. In the depicted embodiment, the spectator linear array sound wave capture device 150 is mounted to the base of a camera positioned in the spectator region 103. Mounting a spectator linear array sound wave capture device 150 on or near a camera may allow an ambient perspective immersive audio experience to be created, such that the captured audio content corresponds with the movement and/or panning of the camera.

Although the depicted spectator linear array sound wave capture device 150 is mounted to the base of a camera positioned in the spectator region 103, a spectator linear array sound wave capture device 150 may be positioned on or near the body of the camera, or anywhere in or near the spectator region 103. The depicted spectator linear array sound wave capture device 150 is a Shure MXA710 two-foot array sound wave capture device, however, the spectator linear array sound wave capture device 150 may be any multi-lobe digital sound wave capture device configured to capture and transmit surrounding audio content. Utilizing a spectator linear array sound wave capture device 150 enables the capture of in-audience sounds adding to the immersive audio experience. Although only one spectator linear array sound wave capture device 150 is shown, multiple such devices may be used throughout the spectator region 103 as may be appropriate for adequate audio coverage.

Some wave capture devices may be strategically placed to capture and process audio signal streams originating from the spectator region 103. Depending on the desired user experience, this audio content may be mixed with other streams for transmission to a remote viewing display, as described further in relation to FIG. 12. Alternatively, the audio signal streams from the spectator region 103 may be isolated according to classified audio source (e.g., shouting vendors, etc.) and/or locality and may be selectively removed from audio streams that form a desired immersive audio experience.

For example, an immersive audio signal processing system 100 may be configured to provide a playing region 102 audio stream mixed with an audio stream of cheers and boos drawn from a crowd seated in the spectator region 103 to add to the immersive audio experience. While in another immersive audio experience, the immersive audio signal processing system 100 may be configured to provide a playing region 102 audio stream with audio signal streams originating from the spectator region 103 entirely removed, if, for example, there is a desire to emphasize player conversations, coaches and referee discussions, floor sounds, or other indistinct on-court sounds.

As further depicted in FIG. 1, the arena environment 101 includes a noise source region 105. A noise source region refers to the portion of the arena environment from which additional sound waves may emanate. In some embodiments, the noise source region may include sound waves from the PA announcer, audio advertisements and announcements, music, and other sounds emanating from the arena environment speakers.

Figure 10:
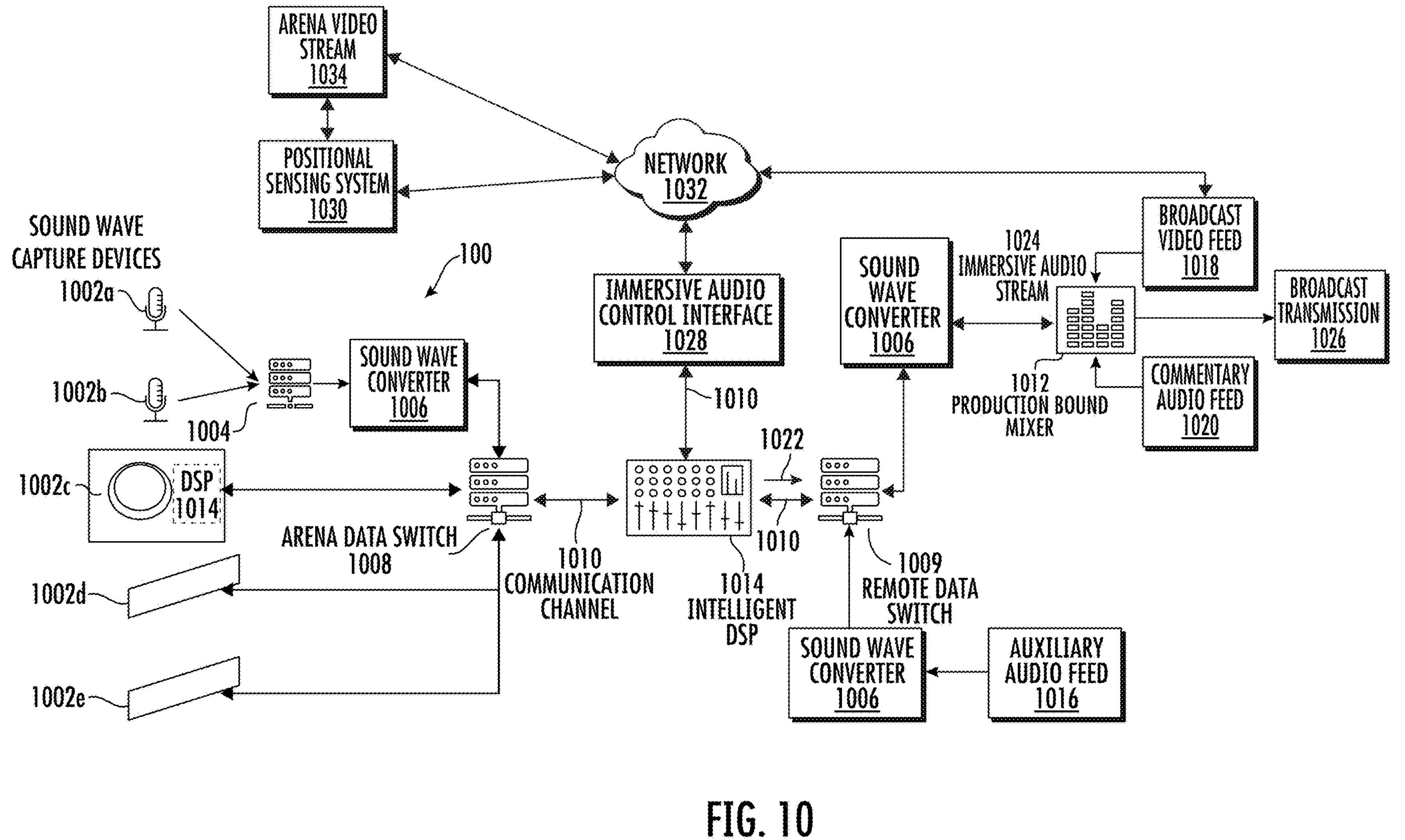
FIG. 10 depicts a schematic illustration of an immersive audio signal processing system, according to an embodiment of the present disclosure.

An immersive audio signal processing system 100 may also include sound wave capture devices (not shown) that are directed toward the noise source region 105. By capturing noise source region 105 originating audio signal streams, such immersive audio signal processing systems 100 are configured to isolate or cancel audio from the noise source region 105. Alternatively, audio streams originating from the noise source region 105 may be captured without dedicated sound wave capture devices by tapping an audio feed to the depicted jumbotron or speaker array to provide an auxiliary audio feed 1016 as shown in FIG. 10.

FIG. 2 depicts a detailed view of an example basketball hoop support assembly 104 as illustrated in FIG. 1. The depicted basketball hoop support assembly 104 comprises a hanging linear array sound wave capture device 122 attached to the bottom surface of its horizontal hoop support beam 112. The hanging linear array sound wave capture device 122 is directed generally toward the surface of the playing region 102. The depicted hanging linear array sound wave capture device 122 is a Shure MXA710 four-foot array sound wave capture device that is configured to produce up to 8 beamformed steerable lobes.

Different steerable lobes emanating from the hanging linear array sound wave capture device 122 may be used to capture sound originating from various regions proximate the basketball hoop support assembly 104. For example, as discussed in detail in FIG. 5, the depicted hanging linear array sound wave capture device 122 may be configured to use highly selective end fire beamformed lobes to capture sound emanating from a direction parallel to the length-wise direction of the linear array and broadside beamformed lobes to capture sound emanating from a direction perpendicular to the length-wise direction of the linear array.

Figure 6:
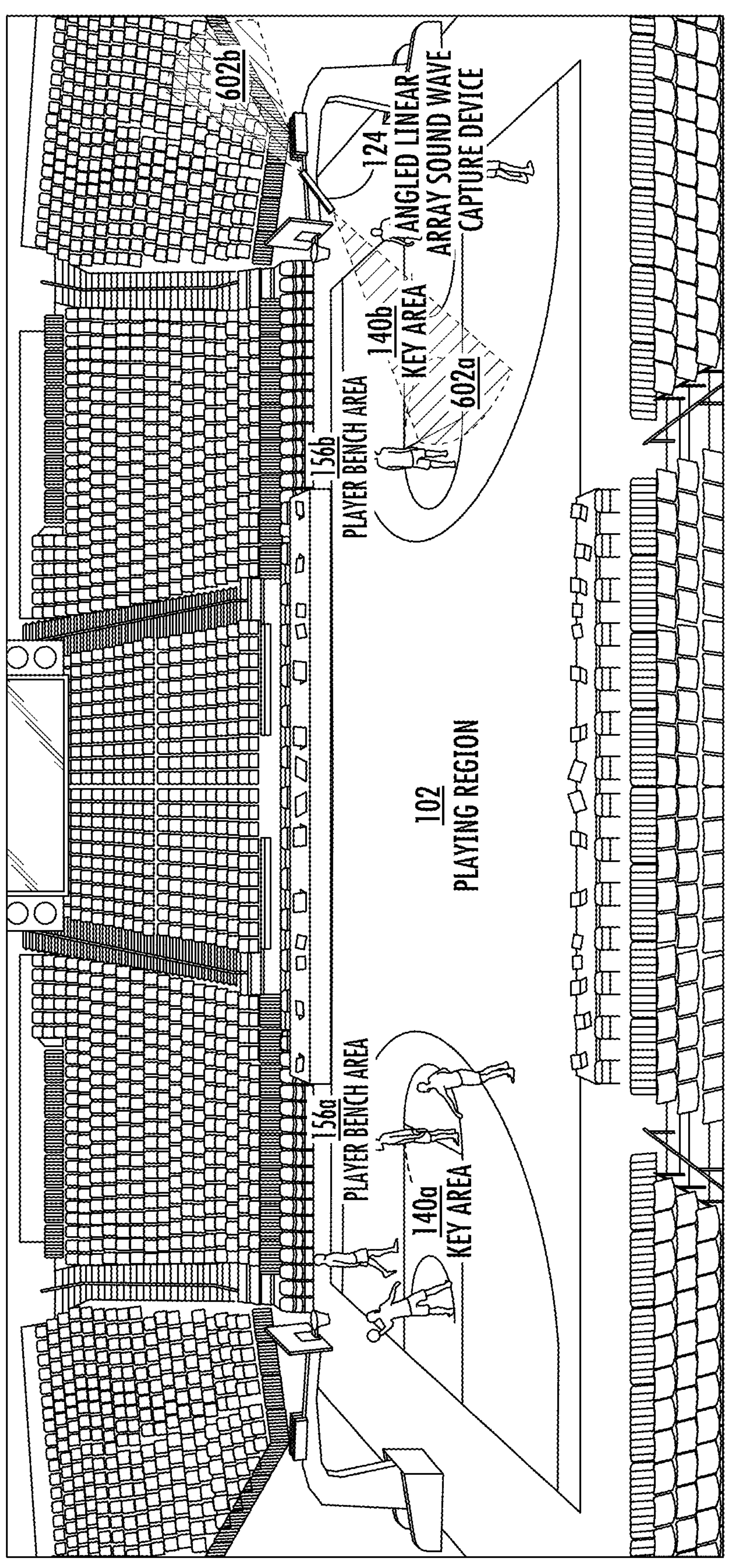
FIG. 6 depicts exemplary beamformed lobes generated by an angled linear array sound wave capture device, according to an embodiment of the present disclosure.

The depicted basketball hoop support assembly 104 further comprises an angled linear array sound wave capture device 124 attached to one side of the basketball hoop support assembly 104 proximate an intersection of the vertical hoop support beam 114 and the horizontal hoop support beam 112. The angled linear array sound wave capture device 124 is attached at an angle off of horizontal such that one end of the angled linear array sound wave capture device 124 is directed toward the playing region 102 immediately beneath the basket. This angled positioning further directs an opposite end of the angled linear array sound wave capture device 124 toward the spectator region 103. Positioning the angled linear array sound wave capture device 124 in this way directs highly selective end fire beams at one end of the angled linear array sound wave capture device 124 toward the playing region 102 and endfire beams produced at the other end of the angled linear array sound wave capture device 124 toward the spectator region 103, as shown in FIG. 6.

The depicted basketball hoop support assembly 104 may further comprise a net sound wave capture device 202 positioned in close proximity to the rim 106. The net sound wave capture device 202 may be a miniature or subminiature microphone capable of placement near the rim 106 and net 108 without interfering with or distracting from the basketball competition. For example, a lavalier microphone, clip microphone, or other similar microphone may be used. By positioning a net sound wave capture device 202 proximate the rim 106, sounds such as the "swish" of a basketball going through the net 108, the "clang" of the basketball hitting the rim 106, and/or player exclamations made during a particularly strong slam dunk may be collected and selectively added to or removed from a target arena environment audio stream of the immersive audio signal processing system 100 depending on the desired user experience.

As referenced herein, a target arena environment audio stream refers to any audio data captured from the playing region, spectator region, noise source region, and the like, of an arena environment that is included in an audio signal stream for purposes of creating an immersive audio experience. The target arena environment audio stream may comprise various desirable sounds, such as player sounds and exclamations; game play sounds such as a bouncing ball, a sliding puck, the smack of a baseball glove; player and official conversations; and other similar sounds. Undesirable sounds, such as curse words, PA announcer sound, crowd conversations, and the like, may be selectively removed from the target arena environment audio stream based on the specific configuration of the immersive audio signal processing system, including a digital environment encoding. In some embodiments, audio data from the spectator region and/or noise source region may be removed to generate the target arena environment audio stream. The target arena environment audio stream is discussed further in relation to FIG. 10 and FIG. 12.

Although not shown here, the basketball hoop support assembly 104 depicted in FIG. 2 may further comprise a hoop shotgun sound wave capture device directed toward the playing region 102 on a surface opposite to the angled linear array sound wave capture device 124 proximate the intersection of the vertical hoop support beam 114 and the horizontal hoop support beam 112. The hoop shotgun sound wave capture device may be a unidirectional microphone positioned to further capture sounds emanating from on the playing region 102 while eliminating sounds off the playing region 102 (i.e., sounds from the spectator region 103) to the side and behind the capture device.

In addition, although not shown here, the immersive audio signal processing system 100 may further comprise a baseline parabolic sound wave capture device which may be manually directed to capture sounds of interest as determined by an operator. Utilizing a baseline parabolic sound wave capture device provides another source for capturing on-court sounds and other sounds deemed to be of interest to the remote spectator viewer and may further inform the location and source of captured audio signal streams in the arena environment 101.

FIG. 3 is a detail view of the first scorer's table **130*a* illustrating example positioning of a ground linear array sound wave capture device 132 and a table top array sound wave capture device 134. The depicted ground linear array sound wave capture device 132 is positioned at or near the base of the first scorer's table 130*a* proximate to the surface of the playing region 102. The depicted ground linear array sound wave capture device 132** is a linear array sound wave capture device, such as a Shure MXA710 four-foot linear array sound wave capture device, that is configured to produce up to 8 beamformed steerable lobes.

The depicted positioning of the ground linear array sound wave capture device 132 enables an immersive audio signal processing system 100 to capture sounds from the playing region 102 such as those produced by players, referees, and coaches' conversations; floor sounds such as shoes squeaking and the ball bouncing; whistles; and similar on-court sounds. A ground linear array sound wave capture device 132 further enables an immersive audio signal processing system 100 to select beams based on playing region location as discussed in connection with FIG. 4. While the ground linear array sound wave capture device 132 illustrated in FIG. 3 is a single four-foot Shure MXA710 linear array sound wave capture device, in other embodiments, two, two-foot Shure MXA710 linear array sound wave capture devices may be used instead.

The depicted table top array sound wave capture device 134 is attached proximate the top surface of the first scorer's table 130*a* and directed toward the playing region 102. A table top array sound wave capture device 134 may be a circular array sound wave capture device configured to perform traditional beamforming techniques and AI based beamforming techniques allowing an immersive audio signal processing system 100 to isolate sounds based on location within the microphone's auditory capture space and source of the audio signal stream. A table top array sound wave capture device 134 allows further capture of on-court sounds, including those produced by player, coach, and referee voices, playing region 102 sounds, and other on-court sounds of interest to a remote viewing spectator. In the depicted embodiment, the table top array sound wave capture device 134 shown is a Shure MXA310 array sound wave capture device.

Though not shown here, table-mounted shotgun sound wave capture devices may also be placed at opposite sides of the second scorer's table 130*b*. The table-mounted shotgun sound wave capture devices may be directed toward the basketball hoop support assemblies 104 on the corresponding ends of the playing region 102 where the bulk of player activity is expected to take place providing overlapping capture of on-court sounds emanating from the parts of the playing region 102 where the majority of the competitive action occurs.

Figure 4:
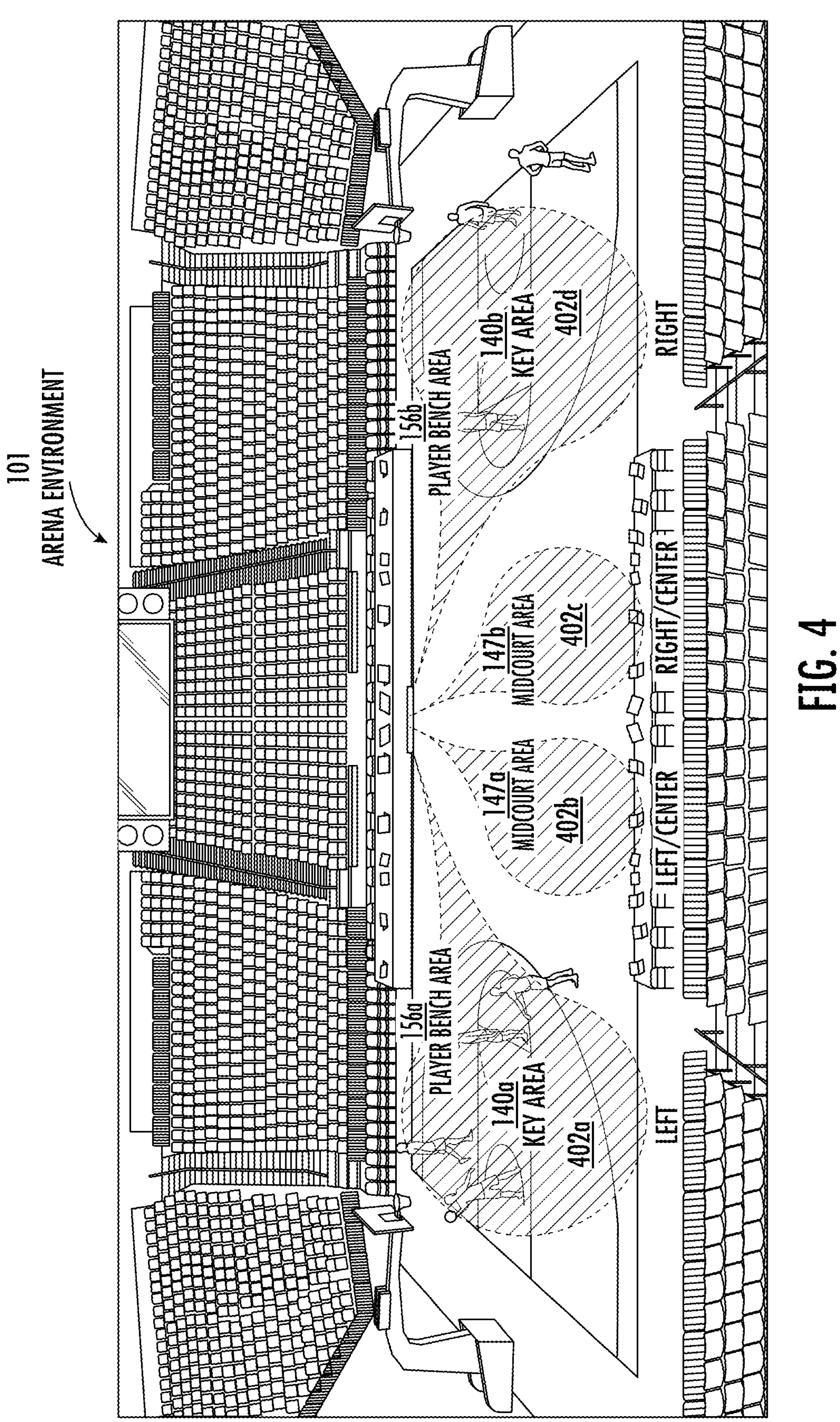
FIG. 4 depicts exemplary beamformed lobes generated by a ground linear array sound wave capture device, according to an embodiment of the present disclosure.

FIG. 4 illustrates example ground array beamformed lobes 402 produced by the exemplary ground linear array sound wave capture device 132 shown in FIG. 1. Beamformed lobes are specific areas within the field of capture of a sound wave capture device from which audio data may be isolated. Beamformed lobes may be formed using signal processing techniques, such as beam forming or spatial filtering. For example, an array sound wave capture device may utilize beamforming techniques such as delay and sum, to define beamformed lobes in the field of capture of a sound wave capture device based on locality. Beamformed lobes formed using beamforming techniques may enable steerable lobes to be generated, capable of precise isolation based on spatial location. In some embodiments, switchable beamformed lobes may be realized by enabling and disabling the various transducers of a switchable digital sound wave capture device.

The depicted ground linear array sound wave capture device 132 in FIG. 4 is a Shure MXA710 linear array sound wave capture device that is configured to utilize a plurality of distinct beamformed lobes (e.g., ground array beamformed lobes 402*a-d*). In the depicted embodiment, ground array beamformed lobe 402*a* is directed to capture sound occurring in a first key area 140*a* while another ground array beamformed lobe 402*d* is directed to capture sound occurring in second key area 140*b*. Another ground array beamformed lobe 402*b* is directed to capture sound occurring in a first midcourt area 147*a* while still another ground array beamformed lobe 402*c* is directed to capture sound occurring in second midcourt area 147*b*.

The depicted ground array beamformed lobes 402*a-d* may be configured to capture audio streams that are routed to four discrete audio channels that are labeled Left, Left/Center, Right/Center, and Right as shown in FIG. 4. Such discrete audio channels may be output to an intelligent digital signal processor 1014 (shown in FIG. 10) on four distinct output ports 1106 as illustrated in connection with block 1104 of FIG. 11.

An immersive audio signal processing system 100 may be configured to select between audio streams captured by the depicted ground array beamformed lobes 402*a-d* depending on the desired immersive audio experience to be included in the target arena environment audio stream 1022 (shown in FIG. 10). For example, a particular ground array beamformed lobe 402*a-d* may be selected based on a location of particular interest (e.g., ground array beamformed lobes 402*b-c* selected to capture tip-off related audio streams).

A ground array beamformed lobe 402*a-d* may also be automatically selected based on the camera angle of the broadcast video feed 1018 (shown in FIG. 10). In such an example, if a broadcast video feed 1018 displays a camera view from the sideline, the immersive audio signal processing system 100 may automatically select the left ground array beamformed lobe 402*a* to be output on the left speakers of a remote viewing entertainment system and the right ground array beamformed lobe 402*d* to output on the right speakers of a remote viewing entertainment system. Further, AI techniques may be used to determine an audio source classification to enhance spatial localization. In such embodiments, a ground array beamformed lobe 402*a-d* may be automatically selected to isolate and amplify audio signal streams containing desired classes of audio content (e.g., on-court sounds) and to remove or cancel audio signal streams containing unwanted classes of audio content (e.g., off-court sounds).

Figure 5:
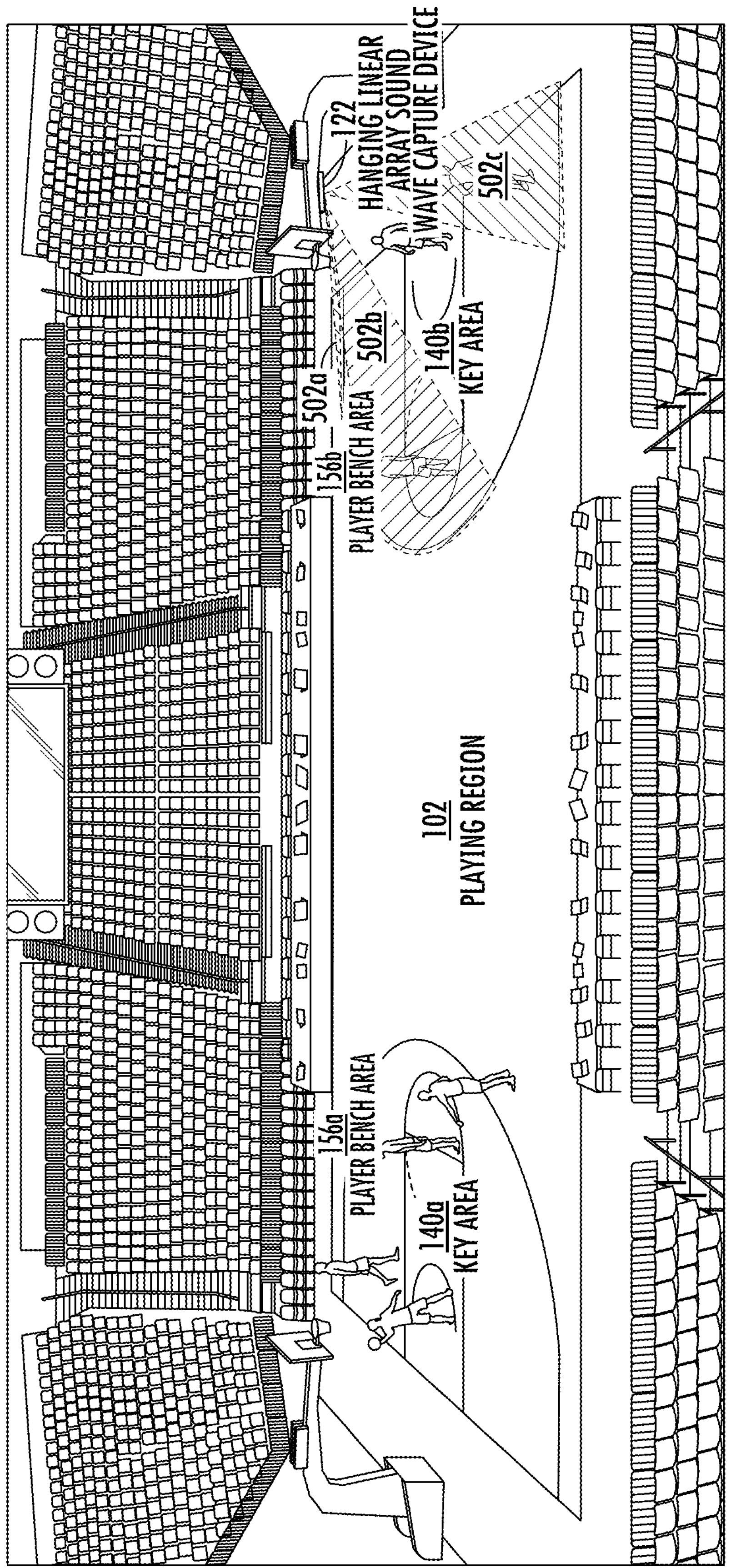
FIG. 5 depicts exemplary beamformed lobes generated by a hanging linear array sound wave capture device, according to an embodiment of the present disclosure.

FIG. 5 illustrates example hanging array beamformed lobes 502*a-c* of an example hanging linear array sound wave capture device 122 of the type depicted in FIG. 2. The depicted hanging linear array sound wave capture device 122 is a Shure MXA710 linear array sound wave capture device that is configured to employ beamforming techniques, such as delay and sum, to create distinct hanging array beamformed lobes 502*a-c*. In the depicted embodiment, hanging array beamformed lobe 502*a* is directed to capture sound occurring in a first baseline area while another hanging array beamformed lobe 502*c* is directed to capture sound occurring in a second baseline area. The third depicted hanging array beamformed lobe 502*b* is directed to capture sound occurring in a top of key area 140*b* as shown.

In the depicted configuration, hanging array beamformed lobes 502*a* and 502*c* may be configured to capture audio streams produced from the baselines and from players and coaches seated in playing region adjacent areas, such as the player bench areas 156*a*, 156*b*. Hanging array beamformed lobe 502*b* is configured to capture audio streams produced from players positioned in the key area 140*a*. Similar to the beamformed lobes discussed above at FIG. 4, an immersive audio signal processing system 100 may be configured to select among the depicted hanging array beamformed lobes 502*a-c* to target audio streams of particular interest based on playing area region or audio class.

FIG. 6 similarly illustrates example angled array beamformed lobes 602*a-b* produced by an example angled linear array sound wave capture device 124 of the type depicted in FIG. 2. The depicted angled linear array sound wave capture device 124 is a Shure MXA710 linear array sound wave capture device that is configured to employ beamforming techniques, such as delay and sum, to create distinct angled array beamformed lobes 602*a-b*.

In the depicted embodiment, a first angled array beamformed lobe 602*a* is directed to the center of the playing region 102, including the key area 140*a*, while a second angled array beamformed lobe 602*b* is directed to the spectator region 103. Further, the angled linear array sound wave capture device 124 may produce a third angled array beamformed lobe (not shown) that is directed toward the noise source region 105. Similar to the beamformed lobes discussed in relation to FIG. 4-FIG. 5, an immersive audio signal processing system 100 may be configured to select among the depicted angled array beamformed lobes 602*a-b* to target audio streams of particular interest based on playing area region or audio class.

Figure 7:
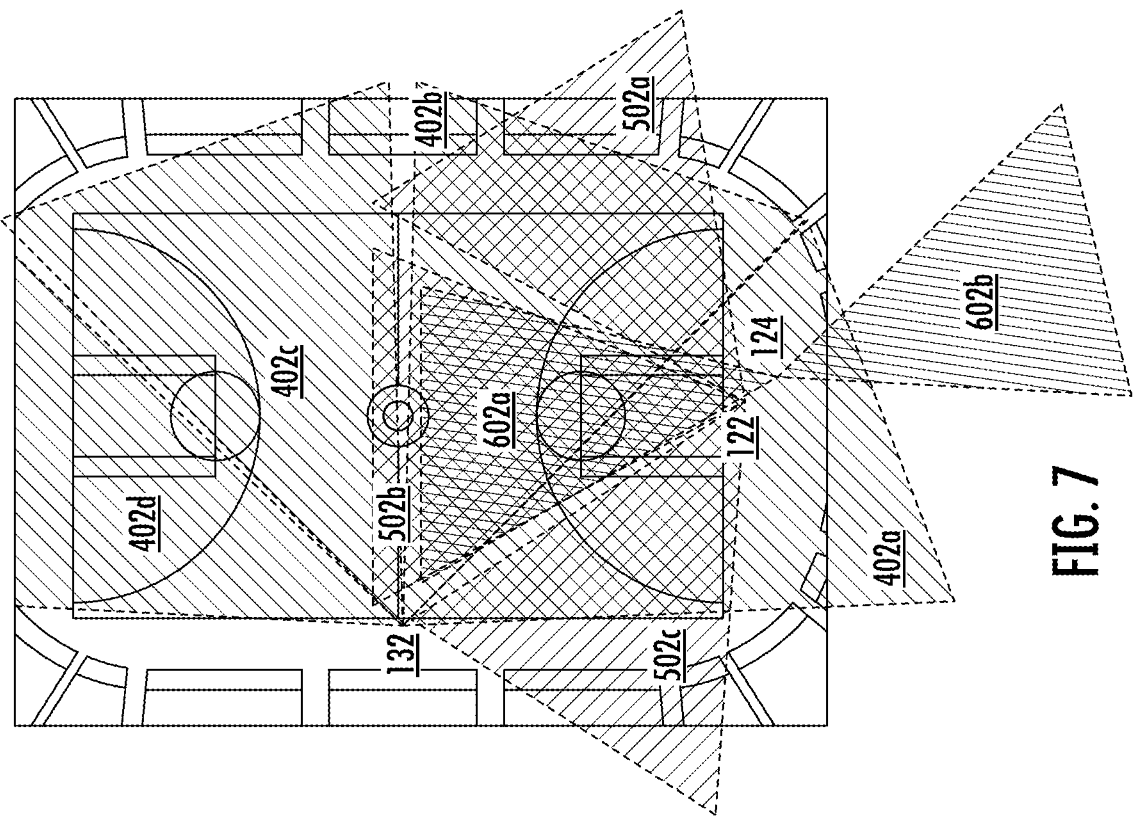
FIG. 7 depicts an approximation of the overlapping beamformed lobes for a selected sample of linear array sound wave capture devices depicted in FIG. 1, according to an embodiment of the present disclosure.

FIG. 7 depicts beamformed lobe coverage patterns produced by an example hanging linear array sound wave capture device 122, an angled linear array sound wave capture device 124, and a ground linear array sound wave capture device 132 positioned as shown in FIG. 1. The depicted hanging linear array sound wave capture device 122 is configured to produce hanging array beamformed lobes 502*a-c*. The depicted angled linear array sound wave capture device 124 is configured to produce angled array beamformed lobes 602*a-b*. The depicted ground linear array sound wave capture device 132 is configured to produce ground array beamformed lobes 402*a-d*.

Although the hanging, angled, and ground array beamformed lobes 402*a-d*, 502*a-c*, and 602*a-b* are shown as primarily generated using various array sound wave capture devices, other multi-lobe sound wave capture devices may be used. For example, steerable beamformed lobes may also be generated utilizing switchable digital sound wave capture devices having multiple transducers that are configured to switch between activated capture transducers, which are directed at different locales.

In reference to FIG. 5, in some embodiments, a switchable digital sound wave capture device may include a first transducer directed to a first baseline area, positioned to capture audio data in a beamformed lobe similar to hanging array beamformed lobe 502*a*. A second transducer may be directed to a second baseline area, positioned to capture audio data in a beamformed lobe similar to hanging array beamformed lobe 502*c*. A third transducer may be directed to a key area 140*b*, positioned to capture audio data in a beamformed lobe similar to hanging array beamformed lobe 502*b*. Similarly, multiple transducers in a switchable digital sound wave capture device may be positioned to capture audio data in beamformed lobes similar to the beamformed lobes 602*a*, 602*b* depicted in FIG. 6.

The depicted overlapping positioning of hanging array beamformed lobes 502*a-c*, angled array beamformed lobes 602*a-b*, and ground array beamformed lobes 402*a-d* produce overlapping audio coverage that converges in areas of greatest expected player activity in the playing region 102. Such overlapping beamformed lobes also enable an immersive audio signal processing system 100 to utilize techniques such as audio source separation, localization of audio classes, and localization of spatial locations of captured audio sounds. These techniques enable identification of the class and the source of an audio signal stream. Utilizing this information, the immersive audio signal processing system 100 may remove unwanted classes of audio signal streams or unwanted locations of audio signal streams depending on the desired immersive audio experience. In addition, the immersive audio signal processing system 100 may coordinate sound locations with output speakers to synchronize the sound output based on the corresponding camera view of the broadcast video feed 1018 (shown in FIG. 10).

FIG. 8 illustrates an exemplary baseball stadium environment 801 as another possible arena environment. The depicted baseball stadium environment 801 is configured to include an immersive audio signal processing system 800 structured in accordance with various embodiments of the present invention. The example baseball stadium environment 801 depicted in FIG. 8 comprises a playing region 802, a spectator region 803, and a noise source region 805. The depicted playing region 802 may include a playing surface or field comprising a home plate area 820, a backstop 822, a pitcher's mound area 828, a first base area 830, a second base area 832, a third base area 834, an outfield area 836, and an outfield wall 838. The depicted baseball stadium environment 801 further includes two playing region adjacent areas, more specifically, dugout area 824 proximate to the third base area 834, and dugout area 826 proximate to the first base area 830. The depicted noise source region 805 includes a jumbotron video board with speakers for playing music and PA remarks to spectators seated in the spectator region 803. Although not shown, noise source regions may be found at various other positions within the depicted baseball stadium environment 801 such as, for example, positions where other PA system speakers are located.

During a baseball game, the depicted playing region 802 is populated with participating players, umpires, team coaches, bat boys, and others. These participants will create a variety of sounds, many of which are not effectively captured by directional microphones and analog setups but which, if captured, would add considerable value to an immersive audio experience for a remote viewing spectator. For example, conversations between players, coaches, and umpires; player exclamations; sounds of the games such as the crack of the bat, the slap of the mitt, and player slides; umpire calls; and many other sounds occur in the playing region 802. Such on-field sounds may be infrequently captured but should play a central role in any immersive audio experience.

The depicted baseball stadium environment 801 further includes a spectator region 803 that provides seating and viewing areas for in-person spectators to watch the game occurring in the playing region 802. The depicted spectator region 803 may be the source of a number of sounds during a baseball game. Some of these sounds may be desirable for inclusion in an immersive audio experience while others are undesirable and should be excluded. For example, crowd cheers and boos may be considered as desirable sounds to be included in an immersive experience while other sounds, such as spectator conversations, exclamations from individual spectators, shouting vendors, and announcements from the PA system, may be deemed undesirable.

The noise source region 805 shown in FIG. 8 is a source for audio signal streams from the PA announcer, audio advertisements and announcements, music, and other sounds emanating from the baseball stadium environment 801 speakers. An immersive audio signal processing system 800 may also include digital sound wave capture devices (not shown) that are directed toward the noise source region 805. By capturing audio signal streams originating from the noise source region 805, such immersive audio signal processing systems 800 may be configured to isolate or cancel audio from the noise source region 805.

As further depicted in FIG. 8, the audio signal processing system 800 comprises a plurality of multi-lobe digital sound wave capture devices positioned near the playing region 802. A first infield digital sound wave capture device 818 is placed proximate the backstop 822 at an angle 840 defined from the line passing through the pitcher's mound and home plate. The first infield digital sound wave capture device 818 may be placed along the backstop 822 at any angle 840, depending on the arrangement of the baseball stadium environment 801, the location of power and other cabling, the location of a protective enclosure (e.g., protective enclosure 904 as described in relation to FIG. 9), the digital sound wave capture devices used, the number of digital sound wave capture devices available, and other similar factors.

In the depicted embodiment, the first infield digital sound wave capture device 818 is placed at an angle 840 that ranges between 30 and 60 degrees, more preferably between 35 and 55 degrees, and most preferably between 40 and 50 degrees. In some embodiments, the first infield digital sound wave capture device 818 may be placed anywhere along the wall dividing the spectator region 803 from the playing region 802, including in the dugout area 824, or any other location enabling the capture of sounds emanating from the infield area of the playing region 802.

As further depicted in FIG. 8, the first infield digital sound wave capture device 818 may be configured to produce a plurality of steerable beamformed lobes (e.g., infield directed beamformed lobes set **810*a*-810*d*). The depicted steerable infield directed beamformed lobes set 810*a*-810*d*** may be generated based on beamformed techniques, such as delay and sum, made possible by the use of array sound wave capture devices. However, steerable beamformed lobes may also be generated utilizing a sound wave capture device having multiple transducers wherein the capture device is configured to remotely switch between activated capture transducers that are aimed at different locations.

As shown in FIG. 8, the infield directed beamformed lobes set **810*a*-810*d* comprise steerable beamformed lobes, wherein each steerable beamformed lobe of the infield directed beamformed lobes set 810*a*-810*d* may be directed at different areas of the playing region 802 to capture sounds that may enhance the immersive audio experience. For example, as depicted in FIG. 8, a first home plate beamformed lobe 810*d* is directed to capture sound from the home plate area 820, while a first pitcher's mound beamformed lobe 810*c* is directed toward the pitcher's mound area 828, a third base beamformed lobe 810*b* is directed toward the third base area 834, and a first dugout beamformed lobe 810*a* is directed toward the dugout area 824. During game play, each of the various steerable beamformed lobes of the infield directed beamformed lobes set 810*a*-810*d*** may be individually enabled, disabled, shifted and/or steered to capture sounds that may enhance the immersive audio experience.

As further depicted in FIG. 8, the audio signal processing system 800 further comprises a second infield digital sound wave capture device 804 placed proximate the backstop 822 on the opposite side of the infield as the first infield digital sound wave capture device 818. In some embodiments, the angle 842 may be identical to the angle 840, positioning the second infield digital sound wave capture device 804 in a symmetric position to the first infield digital sound wave capture device 818. In some embodiments, the second infield digital sound wave capture device 804 is placed at any angle 842 between 30 and 60 degrees, more preferably between 35 and 55 degrees, most preferably between 40 and 50 degrees.

As further depicted in FIG. 8, each steerable beamformed lobe of the infield directed beamformed lobes set **812*a*-812*d* may be directed at different areas of the playing region 802 to capture sounds that may enhance the immersive audio experience. For example, as depicted in FIG. 8, a second home plate beamformed lobe 812*a* is directed to capture sound from the home plate area 820, while a second pitcher's mound beamformed lobe 812*b* is directed toward the pitcher's mound area 828, a first base beamformed lobe 812*c* is directed toward the first base area 830, and a second dugout beamformed lobe 812*d* is directed toward the dugout area 826. During game play, each of the various steerable beamformed lobes of the infield directed beamformed lobes set 812*a*-812*d*** may be individually enabled, disabled, shifted and/or steered to capture sounds that may enhance the immersive audio experience.

The depicted audio signal processing system 800 further comprises a first outfield digital sound wave capture device 806 that is configured to produce a plurality of steerable beamformed lobes (e.g., outfield directed beamformed lobes **814*a*-814*d*) positioned on or near the outfield wall 838 and a second outfield digital sound wave capture device 808 that is configured to produce a plurality of steerable beamformed lobes (e.g., outfield directed beamformed lobes 816*a*-816*d*) positioned on or near the outfield wall 838. The first outfield digital sound wave capture device 806 and the second outfield digital sound wave capture device 808 may be placed in various positions along the outfield wall 838 to selectively capture sounds emanating from the outfield area 836, such as, outfielder conversations, the slap of the ball in an outfielder's mitt upon making a catch, the sounds of exertion or strain as an outfielder dives to catch a sinking potential base hit, the thump of an outfielder hitting the outfield wall 838** as they stretch to rob a home run ball, and so on.

The one or more of the digital sound wave capture devices shown in FIG. 8 (e.g., first infield digital sound wave capture device 818, second infield digital sound wave capture device 804, first outfield digital sound wave capture device 806, second outfield digital sound wave capture device 808) may comprise digital sound wave capture devices having an array architecture, such as a Shure MXA920, a Shure Hermes III, or other similar devices. In some embodiments, one or more of the digital sound wave capture devices may comprise a digital device having one or more transducers positioned to capture sound waves in various directional beamformed lobes. In such embodiments, the various directional beamformed lobes are steerable in that they may be individually positioned and repositioned as needed during game play in order to support an immersive audio experience.

The digital sound wave capture devices depicted in FIG. 8 may provide enhanced range of capture specifically configured to capture audio emanating from greater distances. For example, audio emanating from the pitcher's mound area 828 may be captured by the first or second infield digital sound wave capture devices 818, 804 that may be positioned 100 to 120 feet away. Audio emanating from players in the outfield area 836 may be captured by the first or second outfield digital sound wave capture devices 806, 808 that may be positioned 175 to 225 feet away. In some embodiments, by utilizing digital sound wave capture devices that are configured to produce directional beamformed lobes, sounds emanating from distant sources may be enhanced, while undesirable audio, such as fan conversations, from closer sources may be minimized. Such directionality enables a digital sound wave capture device to isolate and enhance audio data emanating from greater distances. Methods of digital signal processing may be further utilized to isolate and enhance audio originating from the playing region 802.

As depicted in FIGS. 1-3 and FIG. 8, each of the sound wave capture devices utilizing multiple beamformed lobes to achieve spatial selectivity (e.g., hanging linear array sound wave capture device 122, angled linear array sound wave capture device 124, ground linear array sound wave capture device 132, table top array sound wave capture device 134, spectator linear array sound wave capture device 150, support base linear array sound wave capture device 152, second infield digital sound wave capture device 804, first outfield digital sound wave capture device 806, second outfield digital sound wave capture device 808, first infield digital sound wave capture device 818) may utilize any multi-lobe digital sound wave capture device. For example, the depicted sound wave capture devices utilizing multiple beamformed lobes may utilize a steerable digital sound wave capture device, such as an array sound wave capture device, and/or a switchable digital sound wave capture device.

Figure 9:
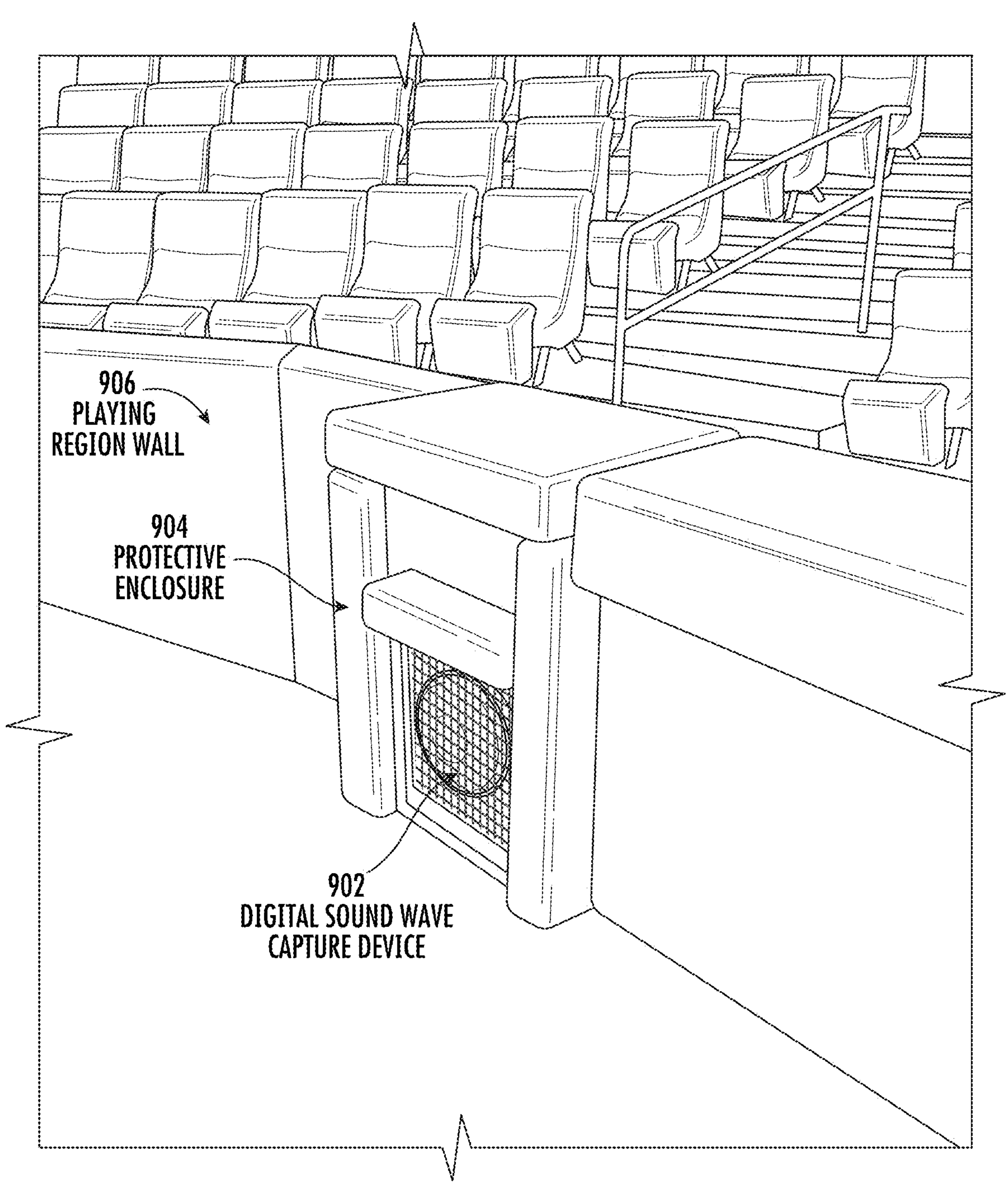
FIG. 9 illustrates an example enclosure for a circular array sound wave capture device in an example stadium environment, according to an embodiment of the present disclosure.

Referring now to FIG. 9, a digital sound wave capture device 902 (e.g., first infield digital sound wave capture device 818, second infield digital sound wave capture device 804, first outfield digital sound wave capture device 806, or second outfield digital sound wave capture device 808) is depicted within a protective enclosure 904 of a playing region wall 906 (e.g., backstop 822, outfield wall 838). A protective enclosure 904 may be any barrier or shield surrounding the digital sound wave capture device 902 that is configured to protect participants from contacting the digital sound wave capture device 902 and associated equipment; to protect the digital sound wave capture device 902 and associated equipment from flying baseballs, bats, players, etc.; and to enable the capture of audio to be included in an immersive audio experience.

In some embodiments, a digital sound wave capture device 902 may be designed to comply with specific requirements related to player and/or performer safety. For example, in the depicted baseball stadium environment 801, any digital sound wave capture device 902 on or near the playing region 802 may be required to be shatter-proof under particular impact standards. A shatter-proof digital sound wave capture device 902 may prevent harmful glass or other dangerous projectiles from injuring players if the digital sound wave capture device 902 is contacted by a flying ball, and/or run into by a player.

Digital sound wave capture devices 902 may also be configured to withstand environmental conditions under certain environmental standards. In some embodiments, such as in the depicted baseball stadium environment 801, the digital sound wave capture devices 902 may be exposed to the elements, such as wind, rain, hail, etc. A digital sound wave capture device 902 may be constructed with reinforcing structures and/or waterproofing structures in order to operate when exposed to certain environment conditions.

In some embodiments, the digital sound wave capture device 902 may be configured to fit the aesthetics of the arena environment. For example, a baseball stadium may require the digital sound wave capture device 902 to be painted to match the home team's colors, and/or other colorful structures in the baseball stadium environment 801. The digital sound wave capture devices 902 may also be positioned in enclosures that are designed to match the aesthetic of the particular arena environment in which it sits.

In some embodiments, a protective enclosure 904 may be an integrated part of the playing region wall 906, for example, a built-in compartment in the playing region wall 906. In some embodiments, the protective enclosure 904 may be a separate structure, for example a structure attached to the playing region wall 906. The depicted protective enclosure 904 includes a durable screen portion that is securely enclosed by wall elements that are padded for player protection.

Although not shown, a hockey stadium environment may comprise another possible arena environment. An example hockey stadium environment may comprise a playing region, a spectator region, and a noise source region. The playing region in a hockey stadium environment may include an ice playing surface, a goal area, boards or a protective wall surrounding the playing surface, and protective glass positioned atop the boards, among other structures. The hockey stadium environment may further include playing region adjacent areas, such as bench areas for each team and penalty box areas.

The spectator region includes spectator seating and surrounds the playing region within the hockey stadium environment. The noise source region may include a jumbotron video board mounted or suspended above the playing region, for example, with speakers for playing music and PA remarks.

Various sound wave capture devices may be positioned around the hockey stadium environment to capture sounds emanating from the playing region, the spectator region, the playing region adjacent region, and the noise source regions. For example, sound wave capture devices may be placed on or near the boards, behind or within the boards, above the protective glass, in the bench areas, in the goal areas, suspended above the playing region, or in other strategic locations to capture sounds throughout the hockey stadium environment.

Various AI classification modules may be utilized to classify sounds and/or identify spatial locations of captured sounds. Sounds considered valuable to the immersive audio experience of a hockey arena environment may be different from sounds deemed valuable to other arena environments. For example, skates sliding across the surface of the ice, player exclamations, conversations, penalty box exchanges, the slap of the puck when encountering a hockey stick or goalie glove, checking sounds particularly when players contact the boards, the clang of a puck contacting a goal post, and so on. The AI classification modules for a hockey arena environment may be trained to recognize and classify the desirable sounds associated with the hockey arena environment for isolation, playback, emphasis, or audio mixing in an immersive audio experience.

FIG. 10 illustrates a schematic illustration of an example immersive audio signal processing system 100 structured in accordance with various embodiments. The depicted immersive audio signal processing system 100 includes a plurality of sound wave capture devices 1002*a-e* that are distributed throughout an arena environment such as the basketball arena environment 101 shown in FIG. 1 or the baseball stadium environment 801 shown in FIG. 8.

The sound wave capture devices 1002*a-e* may be, for example, standard microphones, linear array sound wave capture devices, planar array sound wave capture devices, round array sound wave capture devices, 3D surface array sound wave capture devices, suspended 3D array sound wave capture devices, parabolic microphones, lavalier microphones, shotgun microphones, switchable digital sound wave capture devices, and/or similar sound wave capturing devices. The sound wave capture devices 1002*a-e* may be packaged into different form factors (e.g., linear, planar, circular, recessed, etc.) that are configured to allow stealth placement that blends into an arena environment (e.g., proximate table edges, near hoops, within floors, etc.).

Sound wave capture devices 1002*a-b* may comprise a wireless transmitter, capable of transmitting audio signal streams wirelessly, or, in some embodiments, transmission may occur through a standard wired communication protocol. In embodiments utilizing wireless transmission from a sound wave capture device 1002*a-b*, a sound wave receiver 1004 may be used to receive the audio data output from one or more wireless sound wave capture devices. Sound wave capture devices may output analog audio signal streams that may need to be converted in order to route the analog audio signal streams to the arena data switch 1008. In such embodiments, a sound wave converter 1006 (e.g., an analog to digital transform) may be used to convert the analog audio signal streams into digital audio signal streams.

The depicted one or more sound wave capture devices 1002*c-e* may comprise digital signal processor (e.g., DSP 1014 as shown in dashed lines) and/or artificial intelligence functionality described in connection with intelligent DSP 1014 (discussed in greater detail in FIG. 12). Such DSP or artificial intelligence functionality could include, without limitation, operations to filter, clean, extract features, improve beamforming, reduce noise, perform echo cancelation, and/or otherwise process audio signal streams.

One or more sound wave capture devices 1002*c-e* may be configured to transmit arena audio data received from selected beamformed lobes on separate audio channels. However, the sound wave capture devices 1002*c-e* may also be configured to transmit arena audio data from selected beamformed lobes on one or more mixed channels.

In some embodiments, a sound wave converter 1006 may not be needed such as in circumstances in which one or more sound wave capture devices 1002*c-e* produce a digital audio signal output. Sound wave capture devices 1002*c-e* may similarly be configured to transmit arena audio data wirelessly. For example, sound wave capture devices 1002*c-e* may be configured to transmit wireless arena audio data according to a 4G, 5G, 6G, or similar wireless protocol. Regardless of source sound wave capture device 1002*a-e*, all output arena audio data is routed to an arena data switch 1008 for further distribution.

In the depicted embodiment, digital arena audio data received at the arena data switch 1008 is transmitted to an intelligent DSP 1014 and an immersive audio control interface 1028 using a communication channel 1010. In some embodiments, communication channel 1010 may be a wired cable connection while, in other embodiments, a wireless communication channel 1010 may be used. The communication channel 1010 may be a high-speed optical connection, for example, a fiber optic cable. In other embodiments, the communication channel 1010 may comprise wiring capable of transmitting digital data, such as coaxial cable or ethernet.

Figure 12:
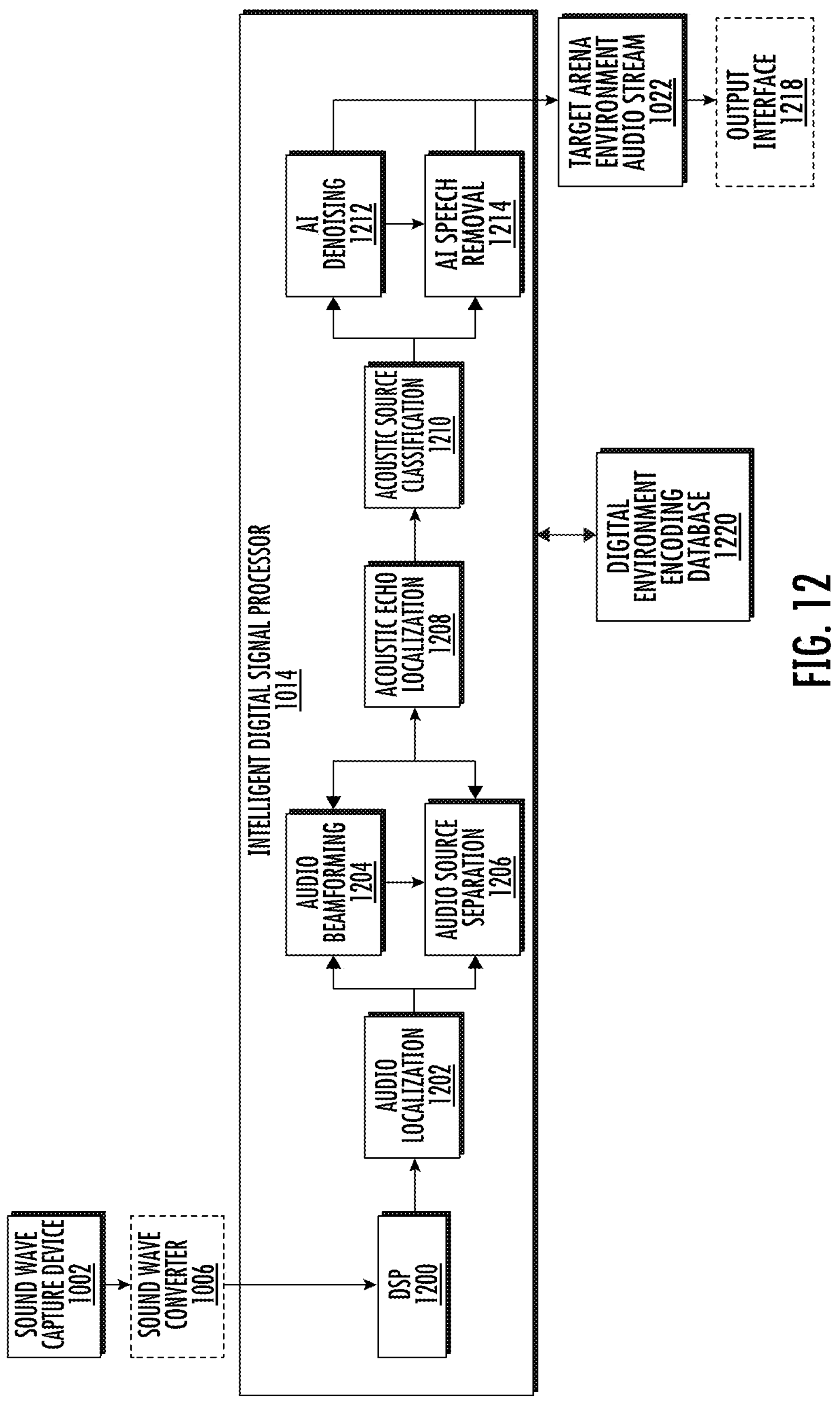
FIG. 12 depicts a schematic illustration of an intelligent digital signal processor configured for use in an immersive audio signal processing system, according to an embodiment of the present disclosure.

The depicted intelligent digital signal processor 1014 may be any device that is capable of mixing and processing disparate audio signal streams comprising the arena audio data captured from various sound wave capture devices 1002*a-e* positioned about an arena environment to produce a target arena environment audio stream 1022 as further described in relation to FIG. 12. As depicted in FIG. 10, the intelligent digital signal processor 1014 is configured to receive arena audio data originating from a variety of sound wave capture devices 1002*a-e* and perform complex digital signal processing on such incoming streams. Digital signal processing operations may include AI denoising, AI speech removal, acoustic echo cancelation, audio beamforming, audio source classification, audio source separation, audio localization, and other similar processes may also be performed by the intelligent digital signal processor 1014 as discussed in greater detail in FIG. 12. In an example embodiment, the intelligent digital signal processor 1014 may be incorporated into a Shure Intellimix P300 or any device executing the Intellimix room software DSP software.

Although depicted between the arena data switch 1008 and the remote data switch 1009, the intelligent DSP may be configured to receive and process arena audio data anywhere within the immersive audio signal processing system 100 where audio signal streams are available. For example, an intelligent DSP 1014 (or some disclosed constituent functionality of DSP 1014) may be hosted by hardware or circuitry of a sound wave capture device (e.g., sound wave capture devices 1002*c*-1002*e*), a device positioned among or between sound wave capture devices 1002*a*-1002*e*, or a device between sound wave converter 1006 and the arena data switch 1008, or other similar locations. Similarly, in some embodiments, the intelligent DSP 1014 related functionality may be combined with the arena data switch 1008 as an aggregate switch and processing unit.

Functionality supported by the intelligent DSP 1014 may also be implemented via hardware and circuitry hosted at the immersive audio control interface 1028, on a network 1032 server, and/or on an end user client device such as a laptop, a production truck associated computer, or the like. In some embodiments, a plurality of intelligent DSPs 1014 or processing units configured with at least some of the functionality of an intelligent DSP 1014 may be distributed throughout the immersive audio signal processing system 100.

The depicted immersive audio signal processing system 100 also includes an immersive audio control interface 1028. The immersive audio control interface 1028 includes one or more communication components configured to provide access to the arena audio data generated by the arena data switch 1008 and/or the target arena environment audio stream 1022 generated by the intelligent DSP 1014.

The immersive audio control interface 1028 communication components may include an application programming interface that is configured to provide access to the arena audio data generated by the arena data switch 1008. The arena audio data generated by the arena data switch 1008 may comprise one or more channels of audio data captured by the one or more sound wave capture devices 1002*a*-1002*e* positioned in an arena environment. The application programming interface may provide functionality to transmit the one or more channels of arena audio data to remote systems that are configured to call the application programming interface.

In some examples, the application programming interface of the immersive audio control interface 1028 may provide DSP functionality, such as that described above in association with the intelligent digital signal processor 1014 or described in greater detail in association with DSP module 1200 of FIG. 12. The one or more channels of arena audio data originating from the one or more sound wave capture devices 1002*a*-1002*e* may be mixed and/or processed using such DSP functionality.

In various example embodiments, virtual reality, augmented reality, and/or mixed reality devices or systems may be configured to call the application programming interface of the immersive audio control interface 1028 to access arena audio data and present an immersive audio experience for users. The arena audio data provided by the application programming interface of immersive audio control interface 1028 includes spatial orientation data that may be particularly suited to virtual reality, augmented reality, and/or mixed reality use cases. In some examples, arena audio data may be supplemented or encoded with position stream data from a positional sensing system (e.g., positional sensing system 1030) to further enhance the source localization and spatial separation data provided to any downstream virtual reality, augmented reality, and/or mixed reality devices.

The immersive audio control interface 1028 may include communication components other than, or in addition to, the above referenced application programming interface such as an edge device configured to transmit arena audio data to a component of a remote network 1032, such as a cloud server. An edge device may include a router, routing switch, multiplexer, wide area network (WAN) device, integrated access device, or other similar device. The immersive audio control interface 1028 comprising an edge device may be configured to transmit arena audio data generated by the arena data switch 1008 to a network 1032 location. Such a transmission enables arena audio data to be accessed from a remote location via the network 1032. Remote access to the arena audio data may enable processing, mixing, DSP techniques, and other audio operations to be performed remotely.

Remote access to the arena audio data may also enable an immersive audio stream (e.g., immersive audio stream 1024) and/or broadcast transmission (e.g., broadcast transmission 1026) to be produced remotely from the arena audio data stored on the network 1032. In addition, end users, patrons, or other arena audio data consumers may be granted access to the network 1032 location receiving the arena audio data. Such arena audio data consumers may leverage the arena audio data to produce additional immersive audio experiences, such as an immersive video game experience utilizing, for example, augmented reality and/or virtual reality systems.

The depicted remote data switch 1009 is configured to receive arena audio data, including, for example, a target arena environment audio stream 1022 from the intelligent digital signal processor 1014, and transmit the audio streams to a production sound mixer 1012 by way of an optional sound wave converter 1006. Additionally, digital audio data feeds such as an auxiliary audio feed 1016 drawn from tapping a PA announcer microphone or other noise source region 105 audio stream may be routed to or through the remote data switch 1009 as shown. As necessary, such auxiliary audio feeds 1016 may be routed through a sound wave converter 1006 as shown.

The auxiliary audio feed 1016 may contain arena audio data from the noise source region (e.g., noise source region 105, noise source region 805) of the arena environment (e.g., arena environment 101, baseball stadium environment 801), for example, the PA announcer, audio data transmitting from the PA system, or other audio signal streams. The intelligent digital signal processor 1014 may use the auxiliary audio feed 1016 to supplement a target arena environment audio stream 1022. However, in other embodiments, the intelligent digital signal processor 1014 may use the auxiliary audio feed 1016 to remove or cancel unwanted signal streams in captured audio, for example, to remove unwanted audio content playing on the PA system captured on other wave capture devices positioned in the arena environment.

Although not shown, audio feeds from other sources may be routed to and through the depicted intelligent digital signal processor 1014 and the production sound mixer 1012 by way of a sound wave converter 1006, or other audio converter/switch. Further, the production sound mixer 1012 may be configured to receive additional audio inputs to be optionally mixed with the target arena environment audio stream 1022 to produce an immersive audio stream 1024.

The depicted production sound mixer 1012 may be configured to receive a target arena environment audio stream 1022 produced by the intelligent digital signal processor 1014, in addition to other audio sources, and produce an immersive audio stream 1024. The target arena environment audio stream 1022 may comprise audio data selected and enhanced to create an immersive audio experience. In some embodiments, the production sound mixer may be utilized to further filter and enhance the audio data comprising the target arena environment audio stream 1022. For example, the target arena environment audio stream 1022 may comprise desirable audio data from the spectator region on a first audio channel, playing region sounds on a second audio channel, and playing region adjacent audio data on a third audio channel. The production sound mixer 1012 may be configured to selectively enhance and/or reduce any channel based on the desired immersive audio experience.

The depicted production sound mixer 1012 may further receive a commentary audio feed 1020 and a broadcast video feed 1018. The commentary audio feed 1020 includes audio data related to commentary of events occurring in the arena environment, for example, play-by-play audio for a sporting event. In the depicted embodiment of FIG. 10, the broadcast video feed 1018 (e.g., target video stream) is received at the production sound mixer 1012. The production sound mixer 1012 may be utilized to synchronize and/or coordinate the broadcast video feed 1018, the commentary audio feed 1020, and the immersive audio stream 1024 to generate a broadcast transmission 1026 comprising video and associated audio data.

In some embodiments, the target arena environment audio stream 1022 may be coordinated with the camera motion of the broadcast video feed 1018 or an arena video stream 1034. An arena video stream 1034 refers to any video data captured in or around the arena environment. In some embodiments, the target arena environment audio stream 1022 may be coordinated with the broadcast video feed 1018 and/or the arena video stream 1034 such that the angle, view, or action captured in the associated video stream is coordinated with the target arena environment audio stream 1022. In some embodiments, a target arena environment audio stream 1022 may be divided into channels wherein each channel or a selected particular set of channels corresponds with a different region of the arena environment. For example, one channel or set of channels may be associated with the home plate area, one channel or set of channels may be associated with the first base area, one channel or a set of channels may be associated with the outfield, and so on.

The motion of a video camera and resulting arena video stream 1034 may be dictated by a positional sensing system 1030. A positional sensing system 1030 refers to a system or device configured to determine the locations of one or more items indicated as items of interest (e.g., targeted item of interest) and transmit in a position data stream the locations of the one or more items of interest to one or more connected devices, for example, utilizing the network 1032. In some embodiments, the position data stream may be broadcast, such that a plurality of connected devices (e.g., an immersive audio signal processing system 100) may access the position data of the one or more items of interest. The audio capture area of one or more sound wave capture devices 1002*a*-1002*e* may be updated or encoded based on the position data of the one or more items of interest in the position data stream.

For example, in a Major League Baseball® game, video cameras may be configured to track the baseball and/or player motion based on feedback from a positional sensing system 1030, such as Statcast™. In a basketball arena environment, a positional sensing system 1030 may track and report the movement of the basketball and/or particular players. In football, a positional sensing system 1030 such as the real time location system used to power Next Gen Stats™ may track the flight of the football and movement of players, and so on.

Such positional sensing systems 1030 are configured to track an item or items of interest moving about the arena environment. Such positional sensing systems 1030 are configured to determine the location of the one or more items of interest and to generate a position data stream (e.g., coordinate data defining x, y, z position per unit time) that can be transmitted to the network 1032 and to various position data stream consuming downstream systems. One example downstream system is a video camera system that is configured to use such position data to programmatically define a moving field of view for one or more cameras to generate an arena video stream 1034 of the one or more items of interest.

For example, some camera systems may be directed or precisely controlled using motors, actuators, and other automated control systems. Such automated control systems may be provided with position data from a positional sensing system 1030 to automatically direct the field of view or views of one or more video camera systems to track a targeted item of interest (e.g., a baseball, football, hockey puck, player, actor, coach, etc.) as it moves about an arena environment and generate an arena video stream 1034.

Another example downstream system is an immersive audio signal processing system 100 configured according to various embodiments discussed herein. For example, an immersive audio signal processing system 100 may be configured to update an audio capture area of one or more multi-lobe digital sound wave capture devices 1002*a*-1002*e* by steering one or more beamformed lobes, for example, produced by a steerable digital sound wave capture device and/or a switchable digital sound wave capture device, based on position data produced by a positional sensing system 1030. By updating the audio capture area based on the location of one or more items of interest, audio data related to such items of interest may be captured automatically, without manual involvement of an operator.

Turning for example to a baseball stadium arena environment, a positional sensing system 1030 may track, determine, and transmit position data that tracks a baseball that has been hit into the outfield. One or more multi-lobe digital sound wave capture devices (e.g., first outfield digital sound wave capture device 806, second outfield digital sound wave capture device 808) may update the audio capture area based on the current and/or projected position of the baseball. The current and/or projected position of the baseball is determined based on position data generated by a positional sensing system 1030. In an instance in which an outfielder dives to catch the baseball, or slams into the wall to attempt to rob a home run, one or more multi-lobe digital sound wave capture devices may be configured to capture and isolate the audio data associated with the on-field action immediately proximate the baseball.

In some embodiments, captured audio data that is generated based on position data from a positional sensing system 1030 may be coordinated with an arena video stream 1034. During a live video broadcast and/or during an instant replay, the target arena environment audio stream 1022 may correspond to a positional sensing system 1030 directed arena video stream 1034. In such embodiments, a localized and source classified audio stream may be programmatically matched to a moving field of view of a video system that is tracking moving players, balls, or other items of interest in an arena environment. Coordinating the captured audio data with the arena video stream 1034 may further enable the capture of updated spatial audio based on the changing field of view of the camera. For example, as a camera pans from left to right, sounds from the arena environment previously correlated spatially with the right speakers of an audio system for a remote viewing spectator may move to the center speakers, and then to the left speakers.

Figure 11:
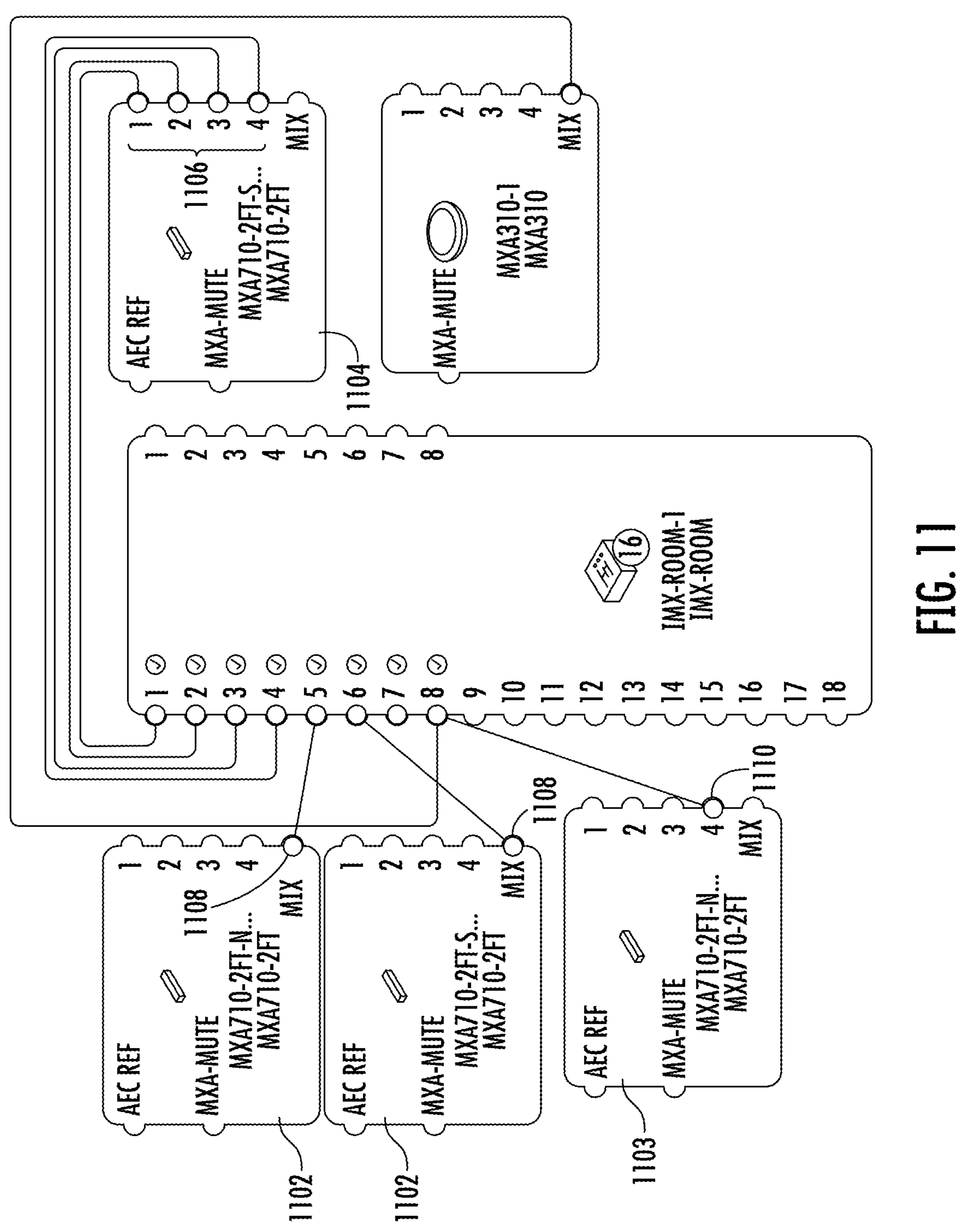
FIG. 11 depicts an exemplary connection diagram for routing audio signal streams from a plurality of sound wave capture devices to an intelligent digital signal processor, according to an embodiment of the present disclosure.

FIG. 11 illustrates an example wiring diagram for routing audio signal streams on defined channels to an example intelligent digital signal processor 1014. For example, a sound wave capture device (e.g., ground linear array sound wave capture device 132 shown in FIG. 1) that is represented by block 1104 may be configured to generate beamformed lobes that capture audio streams from four discrete playing region areas, which are output on four audio channels as represented by output ports 1106. In addition, sound wave capture devices (e.g., hanging linear array sound wave capture devices 122 as shown in FIG. 1) represented by blocks 1102 may be configured to generate beamformed lobes that capture audio streams from overlapping playing region areas, which are output on a single mixed audio channel as represented by output ports 1108. Further, a sound wave capture device (e.g., an angled linear array sound wave capture device 124 as shown in FIG. 1) that is represented by block 603 may be configured to generate one or more beamformed lobes that are directed to a spectator region 103 to capture undesirable audio streams, which are output on a single audio channel as represented by output port 1110.

FIG. 12 depicts a schematic illustration of an intelligent digital signal processor 1014 configured for use in an immersive audio signal processing system 100 according to various embodiments of the present disclosure. The depicted intelligent digital signal processor 1014 is configured to process audio streams captured by various sound wave capture devices 1002 such as sound wave capture devices 1002*a-e* shown in FIG. 10 and/or those more specific sound wave capture devices shown in FIG. 1. In circumstances in which analog audio streams are produced by one or more sound wave capture devices 1002*a-e*, such analog audio streams may be routed through a sound wave converter 1006, as shown, in preparation for processing by an intelligent digital signal processor 1014.

The depicted intelligent digital signal processor 1014 comprises various audio processing modules that are configured to receive audio signal streams from the various sound wave capture devices positioned in and around the arena environment. The intelligent digital signal processor is configured to analyze the captured audio signal streams and determine the relevance of the audio signal to the immersive audio experience for a remote spectator. Determining the relevance of the audio signal to the immersive audio experience may include identifying the source of the audio signal stream, identifying the content of the audio signal stream, parsing or analyzing metadata associated with the audio signal stream, and/or classifying the type of the audio signal stream.

As further described herein, the one or more analyzed audio signal streams may be transmitted as a portion of a target arena environment audio stream 1022, based on the determinations of the intelligent digital signal processor 1014. In some embodiments, the target arena environment audio stream 1022 may be transmitted through an output interface 1218 and directly to a remote spectator display. In some embodiments, the target arena environment audio stream 1022 may be transmitted on various channels to a production sound mixer 1012 or similar device to be further mixed, selected, and removed in order to produce an immersive audio stream for transmission to a remote viewer display.

As depicted in FIG. 12, the depicted intelligent digital signal processor 1014 includes a DSP module 1200 that is configured to use sound wave processing techniques to enhance or manipulate digital audio signals. A DSP may be used to perform operations such as automatic gain control, audio encoding/decoding, static and other simple noise removal, resampling, and so on.

The depicted intelligent digital signal processor 1014 further comprises an audio localization module 1202. In some embodiments, an audio localization module 1202 may be configured to map received audio waves and/or an audio source to a physical location in the arena environment 101 or baseball stadium environment 801. By assigning audio sources to a known physical location, an immersive audio signal processing system 100 may be configured to remove audio streams emanating from unwanted locations. Alternatively, an immersive audio signal processing system 100 may be configured to isolate and enhance audio streams emanating from desirable locations.

The depicted intelligent digital signal processor 1014 is further configured to comprise an audio beamforming module 1204 configured to determine or refine beamformed lobes of the immersive audio signal processing system 100. The audio beamforming module 1204 may employ traditional means of beamforming such as delay and sum or may employ deep neural network (DNN), other specifically trained machine learning (ML) models, or other artificial intelligence (AI)-based techniques (referred to herein as "ML/AI techniques") to perform beamforming.

The depicted intelligent digital signal processor 1014 is further configured to comprise an audio source separation module 1206. Audio source separation modules 1206 as discussed herein are configured to isolate, route, or filter discrete audio sources from one or more audio streams. The audio source separation module 1206 may employ its own sophisticated ML/AI techniques to aid in the separation of audio sources. Additionally, the audio source separation module 1206 may be configured to route certain audio sources to dedicated audio channels for specific use cases. Further, the audio source separation module 1206 discussed herein may rely on audio beamforming from the audio beamforming module 1204 discussed above, while in other embodiments source separation may be performed without the aid of the audio beamforming module 1204.

The audio source separation module 1206 may be configured to identify and isolate targeted audio in an arena environment. For example, the audio source separation module 1206 may train and apply various ML/AI techniques to recognize targeted audio data, such that the targeted audio data may be isolated from other audio present in an audio signal. Targeted audio data may include crowd noise, player exclamations, sounds of the game (e.g., crack of a bat, ball hitting a mitt, ball bouncing, squeaking shoes, slap shots, etc.), PA noise, background music, etc. Isolated target audio data may be removed, enhanced, turned down, or otherwise altered. An example audio source separation device is discussed in detail in connection with the audio processing systems disclosed in commonly owned U.S. Patent Publication No. 2023/0352040 A1, entitled "AUDIO SOURCE FEATURE SEPARATION AND TARGET AUDIO SOURCE GENERATION," and filed on Apr. 28, 2023, which is hereby incorporated by reference in its entirety.

The intelligent digital signal processor 1014 may be configured to cancel crowd noise. For example, an intelligent digital signal processor 1104 may be configured to utilize a neural network to identify frequency bands associated with crowd noise. The isolated crowd noise may be removed, enhanced, turned down, or otherwise altered. In one example, crowd noise may be removed from various sound wave capture devices in or near the crowd, such as examples in which arena, television, or radio announcer microphones incorporate intelligent digital signal processing solutions. An example apparatus, computer-implemented method, and computer program product are discussed in detail in commonly owned U.S. Provisional Patent Application No. 63/512,512, titled "AUDIO ENHANCEMENT AND OPTIMIZATION OF AN IMMERSIVE ARENA BASED AUDIO EXPERIENCE," and filed on Jul. 7, 2023, which is hereby incorporated by reference in its entirety.

The depicted intelligent digital signal processor 1014 further comprises, an acoustic echo cancelation module 1208 configured to reduce or null echo introduced into one or more audio streams via the positioning of the sound wave capture devices proximate the arena environment.

The depicted intelligent digital signal processor 1014 is further configured to comprise an acoustic source classification module 1210 that is configured to identify and label audio sources or classes. Acoustic source classification modules 1210 as discussed herein may rely on simple techniques such as those that determine audio source from fixed microphone locations (i.e., audio streams from a coach mounted lavalier microphone can be reliably tagged as coach-sourced) or on more sophisticated techniques such as those that might employ ML/AI techniques to distinguish between on-court sounds and off-court sounds. In various embodiments, the acoustic source classification module 1210 may be configured to classify the following audio sounds: crowd noise, player speech, floor sounds, ambient sound, PA noise, whistles, and so on.

In some embodiments, the acoustic source classification module 1210 may utilize machine learning or other artificial intelligence algorithms to identify specific acoustic sources and selectively include or exclude sources from the immersive audio experience. For example, the acoustic source classification module 1210 may be configured to identify a noise source and noise source components. A noise source refers to the origin or cause of noise, often undesirable, emanating from any region within an arena environment. A noise source may be a PA speaker, arena speakers generating background music and/or advertisements, spectator conversations, wind, squeaking shoes, and/or other similar sounds. A noise source may provide a separate audio feed available to the immersive audio signal processing system through one or more additional audio channels. Identified sources may be selectively removed or enhanced and/or automatically removed or enhanced during operation.

The acoustic source classification module 1210 may be further configured to identify noise audio components. Noise audio components are any undesirable audio data received by a sound wave capture device within the arena environment. For example, noise audio components may include spectator conversations, exclamations from individual spectators, vendor exclamations, announcements from the PA system, background music, and other similar undesirable audio data.

The acoustic source classification module 1210 may utilize a noise source classification to identify an audio signal stream as a noise source and/or the noise audio components within the audio signal stream. A noise source classification refers to a set of features or parameters commonly associated with a noise source. For example, a noise source classification may include frequencies, amplitudes, reverberations, and other similar sound wave features, along with locations, distances, and other features common to one or more particular noise sources. In some embodiments, a noise source classification may be utilized to identify and isolate the noise source.

One or more beamformed lobes may be updated based on the noise source classification. Updating a beamformed lobe may include any action performed to enhance or suppress at least a portion of the received audio data. Updates to sound wave capture devices may include filtering or amplifying certain frequencies of audio data, and/or filtering or amplifying audio data based on location. Updates to beamformed lobes may be accomplished through DSP configuration and algorithms, enabling or disabling hardware or software filters, adjusting beamforming parameters to steer the location of beamformed lobes, and/or enabling or disabling portions of the digital sound wave capture device (e.g., condenser, transducer) to modify the field of capture of a sound wave capture device.

In one example, in an instance in which a portion of audio data is identified as an unwanted source based at least in part on the frequency, a digital sound wave capture device or associated DSP may be configured to For example, in an instance in which a portion of audio data captured by a steerable digital sound wave capture device is identified as an unwanted source, The depicted intelligent digital signal processor 1014 further comprises, an AI denoising module 1212 that is configured to use ML/AI techniques to determine denoising masks that can be applied to an audio signal sample to remove, cancel, or mute undesired noise, speech, off-court sounds, PA announcements, arena music, and the like. An example AI denoising module 1212 is discussed in detail in connection with the audio processing systems disclosed in commonly owned U.S. patent application Ser. No. 17/679,904, titled "DEEP NEURAL NETWORK DENOISER MASK GENERATION SYSTEM FOR AUDIO PROCESSING," and filed on Feb. 24, 2022, which is hereby incorporated by reference in its entirety.

The depicted intelligent digital signal processor 1014 further comprises an AI speech removal module 1214 configured to utilize ML/AI techniques to recognize and remove undesired words and/or sounds from the audio signal streams. Such AI speech removal functionality is discussed in detail in commonly owned U.S. patent application Ser. No. 17/679,904, which is incorporated by reference above. In some embodiments, the AI speech removal module 1214 discussed herein may rely on AI denoising from the AI denoising module 1212 discussed above to remove undesired noise before removing undesired speech. Alternatively, the AI speech removal may be performed without the aid of the AI denoising module 1212.

In various embodiments, one or more of the DSP module 1200, AI denoising module 1212, AI speech removal module 1214, acoustic echo cancelation module 1208, audio beamforming module 1204, acoustic source classification module 1210, audio source separation module 1206, and audio localization module 1202 may be omitted from the intelligent digital signal processor 1014 and instead positioned within some other component of the immersive audio signal processing system 100. For example, one or more of the DSP module 1200, AI denoising module 1212, AI speech removal module 1214, acoustic echo cancelation module 1208, audio beamforming module 1204, acoustic source classification module 1210, audio source separation module 1206, and audio localization module 1202 may be configured for placement in one or more of the sound wave capture devices 1002*a-e* shown in FIG. 10.

The depicted intelligent digital signal processor 1014 is configured to process the received one or more audio signal streams through one or more of the depicted DSP module 1200, AI denoising module 1212, AI speech removal module 1214, acoustic echo cancelation module 1208, audio beamforming module 1204, acoustic source classification module 1210, audio source separation module 1206, and audio localization module 1202 before outputting a target arena environment audio stream 1022 as shown.

In some examples, the various processing modules of the intelligent digital signal processor 1014 may be leveraged to create an immersive audio experience based on a perspective location. Using digital signal processing techniques, such as audio source classification, audio source separation, and audio localization, an immersive audio experience may be created from a selected perspective within the arena environment, for example, from the perspective of an audience member in the stands; a player playing on the playing surface; or another location within the arena environment.

In creating an immersive audio experience based on a perspective location, the intelligent digital signal processor 1014 may be configured to receive location data (e.g., coordinate data defining x, y, z position) representing the perspective location within the arena environment. The intelligent digital signal processor 1014 may be further configured to leverage the various audio processing modules to collect, mix, filter, and otherwise process audio data from within the arena environment relative to mimic the audio experience experienced at the perspective location.

For example, audio localization spatial filtering techniques may be utilized to associate a perspective location to captured audio data. Audio data captured by sound wave capture devices or steered beams of sound wave capture devices that are positioned near the perspective location may be selected based on the received location data. In some examples, the intelligent digital signal processor 1014 may be configured to enhance captured audio data by updating an audio capture area of one or more multi-lobe digital sound wave capture devices by steering and/or switching one or more beamformed lobes based on the perspective location.

Audio sources may be separated, classified, mixed, and selectively included or excluded from the target arena environment audio stream 1022 based on the perspective location. For example, desirable and undesirable audio sources may vary based on the perspective location. Desirable audio sources may be included and/or enhanced in the target arena environment audio stream 1022, while undesirable audio sources are excluded from the target arena environment audio stream 1022. Public address announcer remarks may be deemed an important part of the immersive audio experience when the perspective location is associated with an audience member in the stands and thereby included in the target arena environment audio stream 1022. However, such remarks may be deemed distracting and unnecessary, and ultimately excluded from the target arena environment audio stream 1022, when the perspective location is shifted to a player playing on the playing surface.

In an instance in which a perspective location is associated with a specific player, coach, or other person or item of interest, the perspective of the immersive audio experience may be updated to track with the movement of the person or item of interest. In such an instance, updated target locations (e.g., updated coordinate data defining x, y, z position) associated with the location of the perspective location may be periodically updated. Updated target locations may include updated position and orientation data related to the position and orientation of the perspective location. Thus, the audio data comprising the target arena environment audio stream 1022 may be updated based on the position and orientation of the person or item of interest.

In one non-limiting example, the perspective of the immersive audio experience may follow a player as they move through a team tunnel (e.g., tunnel area) from the locker room onto the playing region. In such an example, the position of a player may be determined by a tracking device worn by the player or by other position sensing systems (e.g., optical tracking systems, laser enabled range tracking systems, etc.,) discussed herein. Location data provided by such systems may be provided to the intelligent digital signal processor 1014 as updated perspective locations. Utilizing the various audio processing modules described herein, the intelligent digital signal processor 1014 may be configured to collect, mix, filter, and otherwise process audio data relative to the updated perspective locations. Thus, in the team tunnel example, the intelligent digital signal processor 1014 may produce an immersive audio experience for a remote spectator that gradually builds in-stadium music, crowd noise, and other arena environment sounds as the player moves through and emerges from the team tunnel into the playing region.

In some examples, although not shown, the functionality of the intelligent digital signal processor 1014 could be implemented on the immersive audio control interface 1028. For example, utilizing the various audio processing modules, target arena environment audio streams 1022 may be generated based on a perspective location, based on a selected audio source, based on a spatial location, or otherwise. Target arena environment audio streams 1022 may be output on a plurality of audio channels. In one example, target arena environment audio streams 1022 may be output to different channels based on perspective location (i.e., an audience member perspective channel, a player perspective channel, etc.). In another example, the target arena environment audio streams 1022 may be output in channels that are used to drive immersive audio playback leveraging remote spectator surround sound systems.

The immersive audio control interface 1028 may be an application programming interface (API), which may be utilized to access pre-processed audio data from the arena environment. For example, the immersive audio control interface 1028 API may enable access of pre-mixed or processed audio data from various perspective locations or audio data that has been enhanced (undesirable audio excluded, etc.) to create an immersive experience. In other examples, the immersive audio control interface 1028 API may be configured to provide beamformed audio data from the various audio capture devices to consuming client devices that can perform their own mixing, processing, enhancement, or the like.

In some examples, the functionality of the intelligent digital signal processor 1014 could be implemented on a client device of a user via a software application. Such a client device may be configured, via the software application, to call the immersive audio control interface 1028 API and thereby obtain beamformed audio data that is then filtered, mixed, and otherwise processed using functionality described in association with one or more of the various audio processing modules of intelligent digital signal processor 1014. In some examples, users are prompted to provide feedback, via the touch interface of a client device, on the respective immersive audio experiences and such feedback is used by the software application to fine tune and/or train the models deployed to create the functionality of the intelligent digital signal processor 1014.

As further depicted in FIG. 12, the depicted intelligent digital signal processor 1014 includes an output interface 1218. An output interface 1218 is any electrical exchange boundary facilitating the transfer of target arena environment audio stream 1022 and other electronic data from the intelligent digital signal processor 1014. In some embodiments, the output interface 1218 may comprise wiring, circuitry, cables, and/or another other communication medium. In some embodiments, the intelligent digital signal processor 1014 may interface with a wireless antenna to output the target arena environment audio stream 1022 as wireless data.

In some embodiments, the target arena environment audio stream 1022 may be transmitted to the output interface 1218 in discrete audio channels as informed by the processing of the audio signal streams. Transmitting the target arena environment audio stream 1022 in discrete channels may enable a remote viewer or a broadcast audio producer (using production sound mixer 1012 shown in FIG. 10) to select targeted audio channels to enhance a particular camera view or video feed. In some embodiments, the target arena environment audio stream 1022 may be encoded according to a surround sound technology protocol, such as Dolby Atmos® and other similar surround sound technologies.

In some embodiments, the intelligent digital signal processor 1014 may be configured to produce a digital environment encoding. A digital environment encoding refers to a set of configuration parameters, weights, or values that were identified or learned by an intelligent digital signal processor 1014 or its constituent components (e.g., DSP module 1200, AI denoising module 1212, AI speech removal module 1214, acoustic echo cancelation module 1208, audio beamforming module 1204, acoustic source classification module 1210, audio source separation module 1206, and audio localization module 1202) to identify and/or enhance preferred audio data and/or suppress, null, or filter undesirable audio data for a specific arena environment. In some embodiments, a digital environment encoding may include frequencies, amplitudes, sound wave patterns, and other similar sound wave features utilized by the various modules within the intelligent digital signal processor 1014 to classify, identify, locate, and filter audio data specific to an arena environment.

Further parameters may include features related to the locations of audio data within the arena environment, for example, distances from particular sound wave capture devices, and other parameters related to the location and orientation of the specific arena environments. The digital environment encoding for a specific arena environment may enable the intelligent digital signal processor 1014 modules to identify, separate, enhance, amplify, and exclude specific audio sources based on historical or training data (e.g., training target arena environment audio streams) captured from immersive audio signal processing systems positioned within similar arena environments. For example, in a baseball stadium environment (e.g., baseball stadium environment 801), a digital environment encoding may configure the acoustic source classification module 1210 to identify wind noise, based on the frequency and pattern of the captured sound wave. Once identified as wind noise, the wind noise may be removed from target arena environment audio stream 1022.

The digital environment encoding is also optimized for particular arena environments as audio data may be excluded as noise in a first arena environment that is included as preferred audio data in a second arena environment. For example, an immersive audio signal processing system installed within a basketball arena environment may be configured to pass/enhance the squeak of player's shoes on the court into a target arena environment audio stream while an immersive audio signal processing system installed within a theater arena environment may be configured to exclude as noise similar squeaks of actor's shoes on a stage.

A digital environment encoding may also be utilized by an intelligent digital signal processor 1014 as a basis for a new arena environment having similar characteristics. For example, the intelligent digital signal processor 1014 in an immersive audio signal processing system deployed in a football stadium arena environment may be configured with a digital environment encoding developed based on a baseball stadium arena environment. The baseball stadium generated digital environment encoding may be utilized in the football stadium arena environment until enough historical or training data may be collected from the football stadium environment to create a discrete digital environment encoding specific to the football stadium environment or to adequately retrain the baseball stadium generated digital environment encoding to create an updated digital environment encoding suited for the football stadium environment.

In still other embodiments, immersive audio signal processing systems configured as described herein may be configured to retrain a digital environment encoding developed based on a first baseball stadium arena environment (e.g., Comerica Park) to create an updated digital environment encoding suited for a second baseball stadium environment (e.g., Wrigley Field). Said differently, a first digital environment encoding may be retrained to create an updated digital environment encoding suited for a second arena environment that is of a common arena type (e.g., baseball stadium environments in this example) as a first arena environment that was used to create the first digital environment encoding. Such retraining may be particularly important in circumstances where arena environments of common arena types have widely differing physical dimensions and acoustic parameters.

A digital environment encoding may include one or more parameters associated with an ML model generated using ML/AI techniques. In some embodiments, the intelligent digital signal processor 1014 may comprise one or more immersive audio machine learning models (e.g., AI denoising module 1212, AI speech removal module 1214, acoustic echo cancelation module 1208, acoustic source classification module 1210, audio source separation module 1206, and audio localization module 1202) configured to enhance, filter, amplify, or otherwise process received arena audio data. In such an embodiment, a digital environment encoding may contain ML model parameters or weights that are configured to tune or train one or more ML models used by the intelligent digital signal processor 1014 to a particular arena environment.

In some embodiments, a digital environment encoding may include sub-region encodings that include configuration parameters, weights, or values that were identified or learned by an intelligent digital signal processor 1014 or its constituent components (e.g., DSP module 1200, AI denoising module 1212, AI speech removal module 1214, acoustic echo cancelation module 1208, audio beamforming module 1204, acoustic source classification module 1210, audio source separation module 1206, and audio localization module 1202) to identify and/or enhance preferred audio data and/or suppress, null, or filter undesirable audio data for a specific regions (e.g., a playing region, a spectator region, playing region adjacent area, etc.) of an arena environment. For example, a digital environment encoding for a baseball arena environment may include discrete sub-region encodings for the playing field, the dugout, and the spectator region. Such sub-region encodings enable immersive audio signal processing systems as discussed herein to produce a target playing region stream for a dugout (e.g., a playing region adjacent area) that includes person to person conversation audio while also producing a target playing region stream for a spectator region that excludes person to person conversation audio.

As further depicted in FIG. 12, the intelligent digital signal processor 1014 is electrically connected to a digital environment encoding database 1220. The digital environment encoding database 1220 is configured to store one or more digital environment encodings, as described herein. Access to a digital environment encoding database 1220 may enable an intelligent digital signal processor 1014 to generate a target arena environment audio stream 1022 specific to a specific arena environment, region, and/or sub-region of a specific arena environment. The intelligent digital signal processor 1014 may access the one or more digital environment encodings from the digital environment encoding database 1220 during operation to aid in the identification, classification, and selection of audio streams during operation.

Importantly, in accordance with various embodiments, target arena environment audio streams 1022 produced by immersive audio signal processing systems are configured to create an immersive audio experience for a remote spectator by virtually positioning the remote spectator within a particular region of an arena environment (e.g., a playing region, a spectator region, playing region adjacent area, etc.) while also optimizing the audio experience (e.g., amplifying or enhancing preferred sounds while filtering or removing undesirable sounds) for the particular region of the arena environment. In some embodiments, this remote spectator virtual position may be selected by a television producer or content generator while, in other embodiments, the remote spectator virtual position may be selected by remote spectators themselves by engaging virtual position option menus presented to a graphical user interface (e.g., an output interface). For example, a remote spectator may choose to begin watching a baseball game virtually by selecting a first immersive audio experience generated from the perspective of the spectator region of a baseball stadium environment but later switch, via option menus rendered to a graphical user interface, to a second immersive audio experience generated from the perspective of the dugout (e.g., a playing region adjacent area).

The immersive audio signal processing system (e.g., immersive audio signal processing system 100) discussed above may generate and/or access an immersive audio corpus comprising audio signal data from one or more arena environments, including arena audio data, target arena environment audio streams, audio signal streams from various sound wave capture devices, location data associated with the audio signal data, noise source components, classification of audio signal data, position data from one or more position sensing systems, and so on.

One or more immersive audio machine learning models may be trained based on the audio signal data stored in the immersive audio corpus. Immersive audio machine learning models may include immersive audio machine learning models trained for a specific arena environment (e.g., a particular venue) or category of specific arena environments (e.g., a particular type of venue). For example, an immersive audio machine learning model trained for a basketball arena may be trained to automatically identify desirable and undesirable sounds for the particular target audio environment and filter, clean, mix, or otherwise alter desirable and undesirable audio outputs to generate a target arena environment audio stream. Similarly, immersive audio machine learning models may be generated and trained for a football arena environment, a hockey arena environment, a baseball arena environment, and so on.

In some examples, an ML model as discussed herein may be employed to modulate active noise cancellation (ANC) for audio output associated with a listening device such as, for example, headphones, earphones, or speakers. For example, in an AI-modulated ANC mode, the ML model may predict whether one or more audio signals include one or more sounds of interest (e.g., floor noises such as squeaking shoes and bouncing balls). The ML model may also be employed to predict one or more frequency bands associated with the one or more sounds of interest. Accordingly, a signal employed for ANC (e.g., an anti-noise signal) may be modulated to reduce cancellation in response to the or more sounds of interest being detected.

As described herein, the term DSP or digital signal processor refers to one or more audio processing elements configured to receive and process audio data. A DSP may perform various operations such as compression, decompression, filtering, equalization, modulation, demodulation, denoising, echo cancelation, reverberation reduction, signal to noise ratio optimization, audio mixing, and the like. DSP may be optimized for rapid or low latency processing of audio signals. For example, a DSP may include hardware, software, memory, operating systems, and/or instruction architecture specifically designed to repeatedly perform operations on a received audio signal. A DSP may leverage multiple levels of pipelining and parallelism to repeatedly and simultaneously perform common signal processing operations. In some examples, DSP operations include a time to frequency digital transform such as a Fourier transform (e.g., a fast Fourier transform, a short-time Fourier transform, etc.) and/or a discrete cosine transform (DCT).

As described herein, ML/AI techniques refer to operations or processes that deploy machine learning models or algorithms. The term "machine learning" refers to a methods and implementations that are used to train complex models and algorithms to receive inputs and generate outputs that lend themselves to various tasks such as prediction. A machine learning model is a computer-implemented algorithm that may learn from data with or without relying on rules-based programming. These models enable reliable, repeatable decisions and results, and may be configured to uncover hidden insights through machine-based learning from historical relationships and trends in the data. In some embodiments, a machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result or output, which is then compared with a target, for each input vector in the training dataset. Based on the result of the comparison and the specific learning algorithm being used, the parameters of the model are adjusted.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, linear separation or boundary identification models, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machine models, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

The ML model may include an input layer, two or more hidden layers, and/or an output layer. Furthermore, each layer of the ML model may include multiple nodes configured as a hierarchy of nodes. Each node of the ML model may also be connected to each node in a subsequent layer of the ML model. For example, each node in the input layer may be connected to each node in a hidden layer, each node in a hidden layer may be connected to each node in another hidden layer or the output layer, etc. Each node of the ML model may be a computational component of the ML model. Furthermore, each node of the ML model may include an input value, a weight value, a bias value, and/or an output value. The ML model may be configured with a non-linear activation function to produce an output. The ML model may also be configured with one or more recurrent elements related to audio processing.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a basketball arena environment, however, one skilled in the art may recognize that such principles may be applied to a variety of arena environments including football stadium environments, hockey stadium environments, soccer stadium environments, baseball stadium environments, concert hall or stadium environments, theatrical environments, and the like. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as “comprises,” “includes,” and “having” should be understood to provide support for narrower terms such as “consisting of,” “consisting essentially of,” and “comprised substantially of”. Use of the terms “optionally,” “may,” “might,” “possibly,” and the like with respect to any element of an embodiment means that the element is not required, or alternatively, the element is required, both alternatives being within the scope of the embodiment(s). Also, references to examples are merely provided for illustrative purposes, and are not intended to be exclusive.

Hereinafter, various characteristics will be highlighted in a set of numbered clauses or paragraphs. These characteristics are not to be interpreted as being limiting on the invention or inventive concept but are provided merely as a highlighting of some characteristics as described herein, without suggesting a particular order of importance or relevancy of such characteristics.

Clause 1. An immersive audio signal processing system positioned proximate an arena environment, the immersive audio signal processing system comprising a plurality of digital sound wave capture devices positioned within the arena environment, wherein the arena environment comprises a first audio capture area and a second audio capture area.

Clause 2. The immersive audio signal processing system of clause 1, further comprising a positional sensing system configured to output position data associated with a targeted item of interest moving from the first audio capture area to the second audio capture area.

Clause 3. The immersive audio signal processing system of any one of clauses 1-2, further comprising a digital signal processor configured to direct one or more of the plurality of digital sound wave capture devices to transition audio capture for producing an audio signal stream from the first audio capture area to the second audio capture area in response to the targeted item of interest moving from the first audio capture area to the second audio capture area based at least in part on the position data.

Clause 4. The immersive audio signal processing system of any one of clauses 1-3, further comprising an output interface configured to output the audio signal stream.

Clause 5. The immersive audio signal processing system of any one of clauses 1-4, wherein the plurality of digital sound wave capture devices comprises a multi-lobe digital sound wave capture device.

Clause 6. The immersive audio signal processing system of any one of clauses 1-5, wherein the digital signal processor is further configured to update a directed beamformed lobe of the multi-lobe digital sound wave capture device from the first audio capture area to the second audio capture area based at least in part on the position data.

Clause 7. The immersive audio signal processing system of any one of clauses 1-6, wherein the multi-lobe digital sound wave capture device comprises a steerable multi-lobe digital sound wave capture device, and wherein the digital signal processor is configured to reposition the directed beamformed lobe from the first audio capture area to the second audio capture area using beamforming techniques.

Clause 8. The immersive audio signal processing system of any one of clauses 1-5, wherein the multi-lobe digital sound wave capture device comprises a switchable multi-lobe digital sound wave capture device comprising a plurality of capture area orientations including at least: a first capture area orientation associated with the first audio capture area; and a second capture area orientation associated with the second audio capture area, wherein the digital signal processor is configured to transition audio capture for producing the audio signal stream from the first audio capture area to the second audio capture area in response to the targeted item of interest moving from the first audio capture area to the second audio capture area by disabling the first capture area orientation and enabling the second capture area orientation.

Clause 9. The immersive audio signal processing system of any one of clauses 1-4, wherein the plurality of digital sound wave capture devices comprises at least: a first digital sound wave capture device associated with the first audio capture area; and a second digital sound wave capture device associated with the second audio capture area; wherein the digital signal processor is configured to transition audio capture for producing the audio signal stream from the first audio capture area to the second audio capture area in response to the targeted item of interest moving from the first audio capture area to the second audio capture area by disabling the first digital sound wave capture device and enabling the second digital sound wave capture device.

Clause 10. The immersive audio signal processing system of any one of clauses 1-4, wherein the arena environment defines a playing region.

Clause 11. The immersive audio signal processing system of any one of clauses 1-4 or 10, wherein the targeted item of interest is within the playing region.

Clause 12. The immersive audio signal processing system of any one of clauses 1-4 or 10-11, wherein the targeted item of interest comprises a baseball, basketball, football, or hockey puck.

Clause 13. The immersive audio signal processing system of any one of clauses 1-4 or 10, wherein the digital signal processor is configured to isolate audio data originating from the playing region.

Clause 14. The immersive audio signal processing system of any one of clauses 1-4, wherein the position data of the positional sensing system is programmatically matched to a moving field of view of a video camera system configured to track the targeted item of interest.

Clause 15. The immersive audio signal processing system of any one of clauses 1-4 or 14, wherein the video camera system is configured to generate a target video stream, and wherein the audio signal stream is coordinated with the target video stream.

Clause 16. The immersive audio signal processing system of any one of clauses 1-4, wherein the position data of the positional sensing system is used to cause a video camera system to move a field of view to track the targeted item of interest.

Clause 17. The immersive audio signal processing system of any one of clauses 1-4 or 16, wherein the video camera system is configured to generate a target video stream and wherein the audio signal stream is coordinated with the target video stream.

Clause 18. The immersive audio signal processing system of any one of clauses 1-4, wherein the arena environment comprises a basketball arena, and wherein the first audio capture area is associated with a midcourt area and the second audio capture area is associated with a key area.

Clause 19. The immersive audio signal processing system of any one of clauses 1-4, wherein the arena environment comprises a baseball stadium, and wherein the first audio capture area is associated with an infield area and the second audio capture area is associated with an outfield area.

Clause 20. The immersive audio signal processing system of any one of clauses 1-4 or 10, wherein the first audio capture area is associated with a team tunnel area and the second audio capture area is associated with the playing region.

Clause 21. The immersive audio signal processing system of any one of clauses 1-4, wherein the digital signal processor is configured to: direct at least one of the plurality of digital sound wave capture devices to a spectator region or a noise source region; isolate noise source audio components originating from one of the spectator region or the noise source region; generate a noise source classification based on the noise source audio components; and update the audio signal stream based on the noise source classification.

Clause 22. The immersive audio signal processing system of any one of clauses 1-4 or 21, wherein the digital signal processor is further configured to: generate an immersive audio corpus comprising a plurality of audio signal streams including a plurality of noise source audio components; train an immersive audio machine learning model based at least in part on the immersive audio corpus; and generate the noise source classification based on the immersive audio machine learning model.

Clause 23. The immersive audio signal processing system of any one of clauses 1-4 or 16, wherein the digital signal processor is configured to receive a perspective location associated with the arena environment, and wherein the digital signal processor is configured to correlate the audio signal stream to the perspective location.

Clause 24. The immersive audio signal processing system of any one of clauses 1-4 or 16 or 23, wherein the digital signal processor is configured to correlate the audio signal stream to the perspective location by: identifying location data associated with the perspective location; and isolating captured audio data from the plurality of digital sound wave capture devices positioned within the arena environment based on the location data associated with the perspective location.

Clause 25. The immersive audio signal processing system of any one of clauses 1-4 or 16 or 23-24, wherein the digital signal processor is configured to correlate the audio signal stream to the perspective location by: identifying updated location data associated with the perspective location; and isolating captured audio data from the plurality of digital sound wave capture devices positioned within the arena environment based on the updated location data associated with the perspective location.

Clause 26. The immersive audio signal processing system of any one of clauses 1-4, wherein a digital sound wave capture device of the plurality of digital sound wave capture devices comprises the digital signal processor.

Clause 27. The immersive audio signal processing system of any one of clauses 1-4, wherein the digital signal processor is further configured to: receive arena audio data from the arena environment; generate an immersive audio corpus comprising at least a portion of the received arena audio data; train an immersive audio machine learning model based at least in part on the portion of the received audio signal data in the immersive audio corpus; and generate a target arena environment audio stream based on the immersive audio machine learning model.

Clause 28. A computer-implemented method comprising receiving, at a digital signal processor, an audio signal stream comprising audio data from a plurality of digital sound wave capture devices, wherein the plurality of digital sound wave capture devices are positioned within an arena environment, and wherein the arena environment comprises a first audio capture area and a second audio capture area.

Clause 29. The computer-implemented method of clause 28, further comprising receiving, from a positional sensing system, position data associated with a targeted item of interest moving from the first audio capture area to the second audio capture area.

Clause 30. The computer-implemented method of any one of clauses 28-29, further comprising directing one or more of the plurality of digital sound wave capture devices to transition audio capture for producing the audio signal stream from the first audio capture area to the second audio capture area in response to the targeted item of interest moving from the first audio capture area to the second audio capture area.

Clause 31. The computer-implemented method of any one of clauses 28-30, further comprising outputting the audio signal stream on an output interface.

That which is claimed:

1. An immersive audio signal processing system positioned proximate an arena environment, the immersive audio signal processing system comprising:

- a plurality of digital sound wave capture devices positioned within the arena environment, wherein the arena environment comprises a first audio capture area and a second audio capture area;
- a positional sensing system configured to output position data associated with a targeted item of interest moving from the first audio capture area to the second audio capture area;
- a digital signal processor configured to direct one or more of the plurality of digital sound wave capture devices to transition audio capture for producing an audio signal stream from the first audio capture area to the second audio capture area in response to the targeted item of interest moving from the first audio capture area to the second audio capture area based at least in part on the position data; and an output interface configured to output the audio signal stream.

2. The immersive audio signal processing system of claim 1, wherein the plurality of digital sound wave capture devices comprises a multi-lobe digital sound wave capture device.

3. The immersive audio signal processing system of claim 2, wherein the digital signal processor is further configured to update a directed beamformed lobe of the multi-lobe digital sound wave capture device from the first audio capture area to the second audio capture area based at least in part on the position data.

4. The immersive audio signal processing system of claim 3, wherein the multi-lobe digital sound wave capture device comprises a steerable multi-lobe digital sound wave capture device, and wherein the digital signal processor is configured to reposition the directed beamformed lobe from the first audio capture area to the second audio capture area using beamforming techniques.

5. The immersive audio signal processing system of claim 2, wherein the multi-lobe digital sound wave capture device comprises a switchable multi-lobe digital sound wave capture device comprising a plurality of capture area orientations including at least:

a first capture area orientation associated with the first audio capture area; and a second capture area orientation associated with the second audio capture area, wherein the digital signal processor is configured to transition audio capture for producing the audio signal stream from the first audio capture area to the second audio capture area in response to the targeted item of interest moving from the first audio capture area to the second audio capture area by disabling the first capture area orientation and enabling the second capture area orientation.

6. The immersive audio signal processing system of claim 1, wherein the plurality of digital sound wave capture devices comprises at least:

a first digital sound wave capture device associated with the first audio capture area; and a second digital sound wave capture device associated with the second audio capture area;

wherein the digital signal processor is configured to transition audio capture for producing the audio signal stream from the first audio capture area to the second audio capture area in response to the targeted item of interest moving from the first audio capture area to the second audio capture area by disabling the first digital sound wave capture device and enabling the second digital sound wave capture device.

7. The immersive audio signal processing system of claim 1, wherein the arena environment defines a playing region.

8. The immersive audio signal processing system of claim 7, wherein the targeted item of interest is within the playing region.

9. The immersive audio signal processing system of claim 8, wherein the targeted item of interest comprises a baseball, basketball, football, or hockey puck.

10. The immersive audio signal processing system of claim 7, wherein the digital signal processor is configured to isolate audio data originating from the playing region.

11. The immersive audio signal processing system of claim 7, wherein the first audio capture area is associated with a team tunnel area and the second audio capture area is associated with the playing region.

12. The immersive audio signal processing system of claim 1, wherein the position data of the positional sensing system is programmatically matched to a moving field of view of a video camera system configured to track the targeted item of interest.

13. The immersive audio signal processing system of claim 12, wherein the video camera system is configured to generate a target video stream, and wherein the audio signal stream is coordinated with the target video stream.

14. The immersive audio signal processing system of claim 1, wherein the position data of the positional sensing system is used to cause a video camera system to move a field of view to track the targeted item of interest.

15. The immersive audio signal processing system of claim 14, wherein the video camera system is configured to generate a target video stream and wherein the audio signal stream is coordinated with the target video stream.

16. The immersive audio signal processing system of claim 1, wherein the arena environment comprises a basketball arena, and wherein the first audio capture area is associated with a midcourt area and the second audio capture area is associated with a key area.

17. The immersive audio signal processing system of claim 1, wherein the arena environment comprises a baseball stadium, and wherein the first audio capture area is associated with an infield area and the second audio capture area is associated with an outfield area.

18. The immersive audio signal processing system of claim 1, wherein the digital signal processor is configured to:

direct at least one of the plurality of digital sound wave capture devices to a spectator region or a noise source region;

isolate noise source audio components originating from one of the spectator region or the noise source region;

generate a noise source classification based on the noise source audio components; and update the audio signal stream based on the noise source classification.

19. The immersive audio signal processing system of claim 18, wherein the digital signal processor is further configured to:

generate an immersive audio corpus comprising a plurality of audio signal streams including a plurality of noise source audio components;

train an immersive audio machine learning model based at least in part on the immersive audio corpus; and generate the noise source classification based on the immersive audio machine learning model.

20. The immersive audio signal processing system of claim 1, wherein the digital signal processor is configured to receive a perspective location associated with the arena environment, and wherein the digital signal processor is configured to correlate the audio signal stream to the perspective location.

21. The immersive audio signal processing system of claim 20, wherein the digital signal processor is configured to correlate the audio signal stream to the perspective location by:

identifying location data associated with the perspective location; and isolating captured audio data from the plurality of digital sound wave capture devices positioned within the arena environment based on the location data associated with the perspective location.

22. The immersive audio signal processing system of claim 21, wherein the digital signal processor is configured to correlate the audio signal stream to the perspective location by:

identifying updated location data associated with the perspective location; and isolating captured audio data from the plurality of digital sound wave capture devices positioned within the arena environment based on the updated location data associated with the perspective location.

23. The immersive audio signal processing system of claim 1, wherein a digital sound wave capture device of the plurality of digital sound wave capture devices comprises the digital signal processor.

24. The immersive audio signal processing system of claim 1, wherein the digital signal processor is further configured to:

receive arena audio data from the arena environment;

generate an immersive audio corpus comprising at least a portion of the received arena audio data;

train an immersive audio machine learning model based at least in part on the portion of the received arena audio data in the immersive audio corpus; and generate a target arena environment audio stream based on the immersive audio machine learning model.

25. A computer-implemented method comprising:

receiving, at a digital signal processor, an audio signal stream comprising audio data from a plurality of digital sound wave capture devices, wherein the plurality of digital sound wave capture devices are positioned within an arena environment, and wherein the arena environment comprises a first audio capture area and a second audio capture area;

receiving, from a positional sensing system, position data associated with a targeted item of interest moving from the first audio capture area to the second audio capture area;

directing one or more of the plurality of digital sound wave capture devices to transition audio capture for producing the audio signal stream from the first audio capture area to the second audio capture area in response to the targeted item of interest moving from the first audio capture area to the second audio capture area;

outputting the audio signal stream on an output interface.

* * * * *